United States Patent
Wan et al.

(10) Patent No.: US 11,201,509 B2
(45) Date of Patent: Dec. 14, 2021

(54) WIRELESS CHARGING DEVICE, WIRELESS CHARGING METHOD, AND DEVICE TO-BE-CHARGED

(71) Applicant: Guangdong Oppo Mobile Telecommunications Corp., Ltd., Guangdong (CN)

(72) Inventors: Shiming Wan, Guangdong (CN); Jialiang Zhang, Guangdong (CN); Dongsun Yang, Guangdong (CN); Shangbo Lin, Guangdong (CN); Jiada Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/528,063

(22) Filed: Jul. 31, 2019

(65) Prior Publication Data
US 2019/0356154 A1 Nov. 21, 2019

Related U.S. Application Data

(63) Continuation of application No. PCT/CN2018/076713, filed on Feb. 13, 2018.

(30) Foreign Application Priority Data

Apr. 7, 2017 (WO) ................ PCT/CN2017/079784

(51) Int. Cl.
*H02J 7/00* (2006.01)
*H02J 50/80* (2016.01)
(Continued)

(52) U.S. Cl.
CPC .............. *H02J 50/80* (2016.02); *H02J 5/005* (2013.01); *H02J 7/00* (2013.01); *H02J 7/0026* (2013.01);
(Continued)

(58) Field of Classification Search
CPC . Y02E 60/12; H02J 7/025; H02J 5/005; H02J 17/00; H02J 50/80; H02J 50/12;
(Continued)

(56) References Cited

U.S. PATENT DOCUMENTS

| 5,808,447 | A | 9/1998 | Hagino |
| 6,208,115 | B1 | 3/2001 | Binder |

(Continued)

FOREIGN PATENT DOCUMENTS

| CN | 2464002 Y | 12/2001 |
| CN | 101233666 A | 7/2008 |

(Continued)

OTHER PUBLICATIONS

Communication pursuant to Article 94(3) EPC issued in corresponding European application No. 17904556.2 dated Dec. 4, 2019.
(Continued)

*Primary Examiner* — Richard Isla
*Assistant Examiner* — Mohammed J Sharief
(74) *Attorney, Agent, or Firm* — Young Basile Hanlon & MacFarlane, P.C.

(57) ABSTRACT

Provided are a wireless charging device, a wireless charging method, and a device to-be-charged. The wireless charging device is configured to conduct wireless communication with the device to-be-charged through communication control circuits to adjust a transmission power of the wireless charging device. The device to-be-charged includes a battery, a wireless receiving circuit, a first charging channel, a detecting circuit, and a communication control circuit.

10 Claims, 9 Drawing Sheets

(51) Int. Cl.

| | | |
|---|---|---|
| *H02J 50/10* | (2016.01) | |
| *H02M 3/07* | (2006.01) | |
| *H04B 5/00* | (2006.01) | |
| *H02J 5/00* | (2016.01) | |
| *H02J 50/12* | (2016.01) | |
| *H02J 7/02* | (2016.01) | |
| *H02J 7/04* | (2006.01) | |

(52) U.S. Cl.
 CPC ........ *H02J 7/0029* (2013.01); *H02J 7/00034* (2020.01); *H02J 7/0044* (2013.01); *H02J 7/00714* (2020.01); *H02J 7/025* (2013.01); *H02J 7/045* (2013.01); *H02J 50/10* (2016.02); *H02J 50/12* (2016.02); *H02M 3/07* (2013.01); *H04B 5/0037* (2013.01); *H04B 5/0075* (2013.01); *H02J 2207/20* (2020.01); *Y02B 40/00* (2013.01)

(58) Field of Classification Search
 CPC ........ H02J 7/0044; H02J 7/0026; H02J 50/10; H02J 7/00; H02J 7/045; H02J 2207/20; H02J 7/00045; H02J 2207/30; H02J 7/00309; H02J 7/00041; H02J 7/00034; H02J 7/007194; H01F 38/14; Y02T 90/122; B60L 11/182; H04B 5/0037; H04B 5/0075; H02M 3/07; Y02B 40/00
 USPC .......................................... 320/108; 307/104
 See application file for complete search history.

(56) References Cited

U.S. PATENT DOCUMENTS

| | | | |
|---|---|---|---|
| 10,298,048 B1* | 5/2019 | Juan | H02J 50/10 |
| 10,778,040 B2 | 9/2020 | Nagaoka | |
| 2011/0156655 A1 | 6/2011 | Kim | |
| 2012/0001485 A1* | 1/2012 | Uchida | H02J 50/12 |
| | | | 307/11 |
| 2012/0293007 A1* | 11/2012 | Byun | H02J 5/005 |
| | | | 307/104 |
| 2012/0300413 A1 | 11/2012 | Iida | |
| 2013/0033235 A1 | 2/2013 | Fukaya | |
| 2013/0285604 A1 | 10/2013 | Partovi | |
| 2013/0285620 A1* | 10/2013 | Yamamoto | H02J 50/60 |
| | | | 320/155 |
| 2014/0191568 A1 | 7/2014 | Partovi | |
| 2014/0247052 A1 | 9/2014 | Hada | |
| 2014/0329472 A1 | 11/2014 | Kovacs et al. | |
| 2014/0379047 A1 | 12/2014 | Meskens | |
| 2015/0015180 A1 | 1/2015 | Miller et al. | |
| 2015/0054456 A1 | 2/2015 | Yamakawa et al. | |
| 2015/0214748 A1 | 7/2015 | Lin et al. | |
| 2015/0357851 A1 | 12/2015 | Huang et al. | |
| 2016/0006267 A1 | 1/2016 | Muratov et al. | |
| 2016/0020630 A1 | 1/2016 | Tseng et al. | |
| 2016/0036497 A1 | 2/2016 | Tavakoli Shiraji et al. | |
| 2016/0049825 A1 | 2/2016 | Green et al. | |
| 2016/0099601 A1 | 4/2016 | Leabman et al. | |
| 2016/0204642 A1 | 7/2016 | Oh et al. | |
| 2016/0320867 A1 | 11/2016 | Chan et al. | |
| 2016/0355095 A1 | 12/2016 | Okamoto | |
| 2016/0380467 A1 | 12/2016 | Shao et al. | |
| 2017/0033590 A1 | 2/2017 | Lee et al. | |
| 2017/0203656 A1* | 7/2017 | Okamoto | H02J 7/025 |
| 2018/0034305 A1 | 2/2018 | Lee et al. | |
| 2018/0069409 A1* | 3/2018 | Tian | H02M 3/33523 |
| 2018/0097372 A1* | 4/2018 | Li | H02J 7/0068 |
| 2018/0097383 A1* | 4/2018 | Kato | H02J 7/0047 |
| 2018/0115179 A1 | 4/2018 | Fan et al. | |
| 2018/0241301 A1* | 8/2018 | Nagaoka | B60L 53/20 |

FOREIGN PATENT DOCUMENTS

| | | |
|---|---|---|
| CN | 101330229 A | 12/2008 |
| CN | 102013717 A | 4/2011 |
| CN | 103036282 A | 4/2013 |
| CN | 202998182 U | 6/2013 |
| CN | 103944243 A | 7/2014 |
| CN | 104160589 A | 11/2014 |
| CN | 104283293 A | 1/2015 |
| CN | 104467130 A | 3/2015 |
| CN | 104600869 A | 5/2015 |
| CN | 104617632 A | 5/2015 |
| CN | 104701955 A | 6/2015 |
| CN | 104752046 A | 7/2015 |
| CN | 105098900 A | 11/2015 |
| CN | 105148402 A | 12/2015 |
| CN | 105226779 A | 1/2016 |
| CN | 105337384 A | 2/2016 |
| CN | 105515210 A | 4/2016 |
| CN | 105529802 A | 4/2016 |
| CN | 205355893 U | 6/2016 |
| CN | 105826066 A | 8/2016 |
| CN | 106026237 A | 10/2016 |
| CN | 106026327 A | 10/2016 |
| CN | 106104958 A | 11/2016 |
| CN | 106169798 A | 11/2016 |
| CN | 106169799 A | 11/2016 |
| CN | 106451705 A | 2/2017 |
| EP | 2590300 A1 | 5/2013 |
| EP | 2824797 A1 | 1/2015 |
| EP | 3068017 A2 | 9/2016 |
| EP | 3113329 A1 | 1/2017 |
| EP | 3133746 A1 | 2/2017 |
| JP | H03189569 A | 8/1991 |
| JP | 2009504116 A | 1/2009 |
| JP | 2009504117 A | 1/2009 |
| JP | 2009518144 A | 5/2009 |
| JP | 2011034306 A | 2/2011 |
| JP | 2011120361 A | 6/2011 |
| JP | 2011139622 A | 7/2011 |
| JP | 2011152018 A | 8/2011 |
| JP | 2012205499 A | 10/2012 |
| JP | 2013115859 A | 6/2013 |
| JP | 2013128400 A | 6/2013 |
| JP | 2013183496 A | 9/2013 |
| JP | 2013243890 A | 12/2013 |
| JP | 2014023348 A | 2/2014 |
| JP | 2014117124 A | 6/2014 |
| JP | 2014155281 A | 8/2014 |
| JP | 2015006068 A | 1/2015 |
| JP | 2015070689 A | 4/2015 |
| JP | 2015156776 A | 8/2015 |
| JP | 2016015862 A | 1/2016 |
| JP | 2016063725 A | 4/2016 |
| JP | 2016063726 A | 4/2016 |
| JP | 2016092959 A | 5/2016 |
| JP | 2016123162 A | 7/2016 |
| JP | 2016152722 A | 8/2016 |
| JP | 2016525331 A | 8/2016 |
| JP | 2017022804 A | 1/2017 |
| JP | 2017046521 A | 3/2017 |
| JP | 2017060328 A | 3/2017 |
| KR | 100792311 B1 | 1/2008 |
| KR | 20120092038 A | 8/2012 |
| KR | 20130007985 A | 1/2013 |
| KR | 101270675 B1 | 6/2013 |
| KR | 20130124698 A | 11/2013 |
| KR | 101580342 B1 | 12/2015 |
| KR | 20160027828 A | 3/2016 |
| KR | 20160028537 A | 3/2016 |
| KR | 20160110023 A | 9/2016 |
| KR | 101676591 B1 | 11/2016 |
| KR | 20170033902 A | 3/2017 |
| TW | 201145753 A | 12/2011 |
| TW | 201533561 A | 9/2015 |
| WO | 2014115193 A1 | 7/2014 |
| WO | 2014176839 A1 | 11/2014 |
| WO | 2015125655 A1 | 8/2015 |
| WO | 2016074458 A1 | 5/2016 |

(56) References Cited

FOREIGN PATENT DOCUMENTS

OTHER PUBLICATIONS

Communication pursuant to Article 94(3) EPC issued in corresponding European application No. 17904556.2 dated May 4, 2020.
The Extended European search report issued in corresponding European application No. 17904431.8 dated Sep. 26, 2019.
Communication pursuant to Article 94(3) EPC issued in corresponding European application No. 17904431.8 dated Jun. 16, 2020.
Examination report issued in corresponding IN application No. 201917008151 dated Jun. 12, 2020.
English translation of the Notice of Reasons for Refusal issued in corresponding JP application No. 2019-514267 dated May 29, 2020.
English translation of the Notification of Reason for Refusal issued in corresponding KR application No. 2019-7007549 dated Mar. 26, 2020.
English translation of the Notification Letter of Review Opinions issued in corresponding TW application No. 107112166 dated Jan. 4, 2019.
Non Final Rejection issued in corresponding U.S. Appl. No. 16/240,862 dated Jun. 23, 2020.
International search report issued in corresponding international application No. PCT/CN2017/085990 dated Jan. 15, 2018.
Communication pursuant to Article 94(3) EPC issued in corresponding European application No. 18781580.8 dated Jun. 25, 2020.
The extended European search report issued in corresponding European application No. 17904556.2 dated Apr. 5, 2019.
International search report issued in corresponding international application No. PCT/CN2018/081963 dated Jul. 11, 2018.
International search report issued in corresponding international application No. PCT/CN2018/081962 dated Jun. 29, 2018.
International search report issued in corresponding international application No. PCT/CN2017/079784 dated Dec. 4, 2017.
International search report issued in corresponding international application No. PCT/CN2018/076713 dated May 18, 2018.
Examination Report issued in corresponding IN Application No. 201734047293 dated Apr. 20, 2020.
Search Report issued in corresponding EP Application No. 20174287.1 dated Jul. 15, 2020.
Notice of Reasons and English Translation for Refusal issued in corresponding JP application No. 2019-549385 dated Oct. 2, 2020.
Decision of Refusal and English Translation issued in corresponding JP application No. 2019-514267 dated Aug. 7, 2020.
Communication pursuant to Article 94(3) EPC issued in corresponding European application No. 18781580.8 dated Oct. 9, 2020.
Extended Search Report for EP Application No. 18781580.8 dated Jan. 24, 2020.
OA3 with English Translation issued in corresponding CN application No. 201780041786.3 dated Oct. 29, 2020.
Examination report issued in corresponding European application No. 17904431.8 dated Dec. 15, 2020.
Non-Final OA issued in corresponding U.S. Appl. No. 16/551,573 dated Dec. 9, 2020.
Charging protocols for lithium-ion batteries and their impact on cycle life—An experimental study with different 18650 high-power cells; XP055765066.
Examination report issued in corresponding European application No. 17904556.2 dated Jan. 19, 2021.
European Examination Report for EP Application 18781580.8 dated Jan. 26, 2021. (6 pages).
Japanese Office Action with English Translation for JP Application 2019-539764 dated Apr. 2, 2021. (21 pages).
Japanese Office Action with English Translation for JP Application 2019-549385 dated Mar. 9, 2021. (12 pages).
Korean Final Office Action with English Translation for KR Application 10-2019-7007549 dated Mar. 19, 2021. (9 pages).
Notice of Allowance with English Translation for KR Application 10-2019-7026966 dated Feb. 2, 2021. (7 pages).
Korean Office Action with English Translation for KR Application 10-2019-7027786 dated Feb. 22, 2021. (17 pages).
U.S. Non-Final Office Action for U.S. Appl. No. 16/271,131 dated Jan. 25, 2021. (46 pages).
Communication pursuant to Article 94(3) EPC for EP Application 1790443.8 dated Jun. 10, 2021. (4 pages)
Final Rejection for U.S. Appl. No. 16/271,131 dated Jul. 2, 2021. (41 pages).
Communication pursuant to Article 94(3) EPC for EP Application 17904556.2 dated Jul. 15, 2021. (4 pages).
Chinese First Office Action with English Translation for CN Application 201780041668.2 dated Jul. 27, 2021. (52 pages).
Chinese First Office Action with English Translation for CN Application 201780017139.9 dated Aug. 23, 2021. (48 pages).
Korean Office Action with English Translation for KR Application 10-2019-7027786 dated Aug. 20, 2021. (8 pages).
Non-Final Rejection for U.S. Appl. No. 16/271,131 dated Oct. 14, 2021.
Indian examination Report for IN Application 201917031642 dated Oct. 7, 2021. (5 pages).
Korean Office Action with English Translation for KR Application 1020197007549 dated Oct. 12, 2021. (7 pages).
Korena Office Action with English Translation issued in corresponding KR application No. 20197027786 dated Oct. 22, 2021.

\* cited by examiner

WIRELESS CHARGING DEVICE, WIRELESS CHARGING METHOD, AND DEVICE TO-BE-CHARGED

CROSS-REFERENCE TO RELATED APPLICATION(S)

This application is a continuation of International Application No. PCT/CN2018/076713, filed on Feb. 13, 2018, which claims priority to International Application No. PCT/CN2017/079784, filed on Apr. 7, 2017, the disclosures of both of which are hereby incorporated by reference in their entireties.

TECHNICAL FIELD

This disclosure relates to the field of wireless charging, and more particularly to a wireless charging device, a wireless charging method, and a device to-be-charged.

BACKGROUND

At present, in the charging field, a device to-be-charged is charged mainly in a wired charging manner.

Taking mobile phones as an example, currently, the mobile phone is still charged mainly in a wired charging manner. When the mobile phone needs to be charged, the mobile phone can be coupled with a power supply device via a charging cable such as a universal serial bus (USB) cable and an output power of the power supply device can be transmitted to the mobile phone via the charging cable to charge a battery of the mobile phone.

As to the device to-be-charged, the charging cable is required for wired charging, which results in complicated operations in a charging preparation stage. Therefore, a wireless charging manner is enjoying increasing popularity among users. However, a conventional wireless charging manner is poor in efficiency and thus needs to be improved.

SUMMARY

Implementations of the present disclosure provide a wireless charging device, a wireless charging method, and a device to-be-charged to improve a wireless charging process.

According to a first aspect of the present disclosure, a wireless charging device is provided. The wireless charging device includes a wireless transmitting circuit and a communication control circuit. The wireless transmitting circuit is configured to transmit an electromagnetic signal to charge the device to-be-charged wirelessly. The communication control circuit is configured to conduct wireless communication with the device to-be-charged during wireless charging and adjust a transmission power of the electromagnetic signal of the wireless transmitting circuit according to the wireless communication.

According to a second aspect of the present disclosure, a device to-be-charged is provided. The device to-be-charged includes a battery, a wireless receiving circuit, a first charging channel, a detecting circuit, and a communication control circuit. The battery includes N cells coupled in series, where N is a positive integer greater than one. The wireless receiving circuit is configured to receive an electromagnetic signal from a wireless charging device and convert the electromagnetic signal into an output voltage and an output current of the wireless receiving circuit. Through the first charging channel, the output voltage and the output current of the wireless receiving circuit are received and provided to the battery for charging. The detecting circuit is configured to detect a voltage and/or a current in the first charging channel. The communication control circuit is configured to conduct wireless communication with the wireless charging device according to the voltage and/or the current in the first charging channel detected by the detecting circuit, where the wireless charging device adjusts a transmission power of the wireless charging device according to the wireless communication to make an output voltage and/or an output current of the first charging channel match a charging voltage and/or a charging current currently required by the battery.

According to a third aspect of the present disclosure, a wireless charging method is provided. The method is applicable to a device to-be-charged and includes the following. A wireless receiving circuit receives an electromagnetic signal from a wireless charging device, and converts the electromagnetic signal into an output voltage and an output current of the wireless receiving circuit. A battery is charged through a first charging channel according to the output voltage and the output current of the wireless receiving circuit, where the battery includes N cells coupled in series, and N is a positive integer greater than one. A voltage and/or a current in the first charging channel is detected. Conduct wireless communication with the wireless charging device according to the voltage and/or the current detected in the first charging channel, where the wireless charging device adjusts a transmission power of the wireless charging device according to the wireless communication, to make an output voltage and/or an output current of the first charging channel match a charging voltage and/or a charging current currently required by the battery.

DETAILED DESCRIPTION

According to implementations of the present disclosure, a device to-be-charged is charged based on wireless charging technology. The wireless charging technology does not require a cable for power delivery, which can simplify operations in a charging preparation stage.

Conventional wireless charging technology generally couples a power supply device (such as an adaptor) with a wireless charging device (such as a wireless charging base), and an output power of the power supply device is transmitted to a device to-be-charged via the wireless charging device in a wireless manner (such as via an electromagnetic signal or an electromagnetic wave) for wireless charging of the device to-be-charged.

According to various wireless charging principles, the wireless charging manner mainly includes three types: magnetic coupling (or electromagnetic induction), magnetic resonance, and radio waves. At present, mainstream wireless charging standard includes QI standard, power matters alliance (PMA) standard, and alliance for wireless power (A4WP) standard. Under the QI standard and in the PMA standard, a magnetic coupling manner is adopted for wireless charging and under the A4WP standard, a magnetic resonance manner is adopted for wireless charging.

Figure 1:
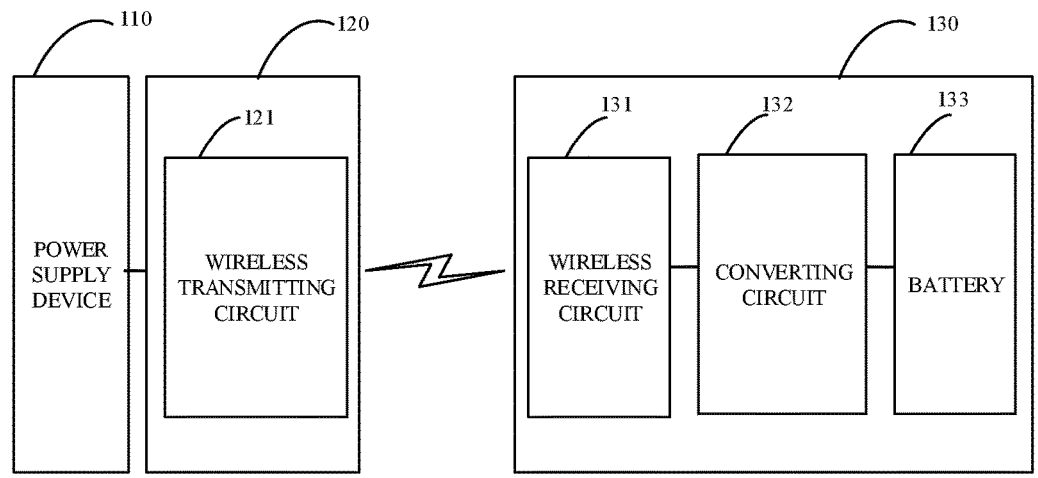
FIG. 1 is an exemplary structural diagram of a conventional wireless charging system.

The following will describe a conventional wireless charging manner in conjunction with FIG. 1.

As illustrated in FIG. 1, a wireless charging system includes a power supply device 110, a wireless charging device 120, and a device to-be-charged 130. The wireless charging device 120 can be, for example, a wireless charging base. The device to-be-charged 130 can be, for example, a terminal.

After the power supply device 110 is coupled with the wireless charging device 120, an output current of the power supply device 110 can be transmitted to the wireless charging device 120. The wireless charging device 120 can convert the output current of the power supply device 110 into an electromagnetic signal (or an electromagnetic wave) via an internal wireless transmitting circuit 121 for transmission. For example, the wireless transmitting circuit 121 can convert the output current of the power supply device 110 into an alternating current (AC) and convert the AC into the electromagnetic signal via a transmitting coil or a transmitting antenna (not illustrated in FIG. 1).

The device to-be-charged 130 can receive the electromagnetic signal from the wireless transmitting circuit 121 via a wireless receiving circuit 131 and convert the electromagnetic signal into an output current of the wireless receiving circuit 131. For example, the wireless receiving circuit 131 can convert the electromagnetic signal transmitted by the wireless transmitting circuit 121 into an AC via a receiving coil or a receiving antenna (not illustrated in FIG. 1) and rectify and/or filter the AC to convert the AC into an output voltage and the output current of the wireless receiving circuit 131.

As to the conventional wireless charging technology, before wireless charging begins, the wireless charging device 120 and the device to-be-charged 130 will negotiate a transmission power of the wireless transmitting circuit 121. When such power negotiated between the wireless charging device 120 and the device to-be-charged 130 is 5 W (watt) for example, the output voltage and the output current of the wireless receiving circuit 131 are respectively 5 V (volt) and 1 A (ampere) in general. When the power negotiated between the wireless charging device 120 and the device to-be-charged 130 is 10.8 W for example, the output voltage and the output current of the wireless receiving circuit 131 are respectively 9 V and 1.2 A in general.

The output voltage of the wireless receiving circuit 131 is however not suitable to be applied directly to a battery 133. Instead, the output voltage needs to be converted by a converting circuit 132 of the device to-be-charged 130 to obtain expected charging voltage and/or charging current of the battery 133 of the device to-be-charged 130.

The converting circuit 132 can be configured to convert (for example, conduct a constant-voltage control and/or a constant-current control on) the output voltage of the wireless receiving circuit 131 to meet requirements on the expected charging voltage and/or charging current of the battery 133.

As an example, the converting circuit 132 can be a charging management module, such as a charging integrated circuit (IC). When the battery 133 is charged, the converting circuit 132 is configured to manage a charging voltage and/or a charging current of the battery 133. The converting circuit 132 can include at least one of a voltage feedback function and a current feedback function to achieve management of at least one of the charging voltage and the charging current of the battery 133 respectively.

For example, a charging process of the battery can include at least one of a trickle charging stage, a constant-current charging stage, and a constant-voltage charging stage. In the trickle charging stage, the converting circuit 132 can utilize the current feedback function to make current flowing into the battery 133 in the trickle charging stage satisfy the expected charging current of the battery 133 (such as a first charging current). In the constant-current charging stage, the converting circuit 132 can utilize the current feedback function to make current flowing into the battery 133 in the constant-current charging stage satisfy the expected charging current of the battery 133 (such as a second charging current, which may be larger than the first charging current). In the constant-voltage charging stage, the converting circuit 132 can utilize the voltage feedback function to make voltage applied to the battery 133 in the constant-voltage charging stage satisfy the expected charging voltage of the battery 133.

As one example, when the output voltage of the wireless receiving circuit 131 is higher than the expected charging voltage of the battery 133, the converting circuit 132 can be configured to decrease (that is, step down) the output voltage of the wireless receiving circuit 131 to make decreased charging voltage meet requirements on the expected charging voltage of the battery 133. As another example, when the output voltage of the wireless receiving circuit 131 is lower than the expected charging voltage of the battery 133, the converting circuit 132 can be configured to increase (that is, step up) the output voltage of the wireless receiving circuit 131 to make increased charging voltage meet requirements on the expected charging voltage of the battery 133.

As yet another example, the output voltage of the wireless receiving circuit 131 is a constant 5 V voltage, for example. When the battery 133 includes a single cell (for example, a lithium battery cell has a 4.2 V charging cut-off voltage), the converting circuit 132 (such as a Buck circuit) can decrease the output voltage of the wireless receiving circuit 131 to make the decreased charging voltage meet requirements on the expected charging voltage of the battery 133.

As still another example, the output voltage of the wireless receiving circuit 131 is a constant 5 V voltage, for example. When the battery 133 includes two or more single-cells coupled in series (for example, lithium battery cells, and each cell has a 4.2 V charging cut-off voltage), the converting circuit 132 (such as a Boost circuit) can increase the output voltage of the wireless receiving circuit 131 to make the increased charging voltage meet requirements on the expected charging voltage of the battery 133.

The converting circuit 132 is limited by low circuit conversion efficiency, which causes electrical energy that fails to be converted to dissipate in the form of heat. The heat can be accumulated inside the device to-be-charged 130. Since designed space and heat dissipation space of the device to-be-charged 130 are both very small, for example, the physical size of a user's mobile terminal is increasingly lighter and thinner, and a large number of electronic components are densely arranged in the mobile terminal at the same time, difficulty in designing the converting circuit 132 is increased. In addition, it is difficult to remove promptly heat accumulated inside the device to-be-charged 130, which in turn results in abnormality of the device to-be-charged 130.

For example, heat accumulated in the converting circuit 132 may cause heat interference with electronic components near the converting circuit 132, which results in working abnormality of the electronic components. For another example, the heat accumulated in the converting circuit 132 may shorten service life of the converting circuit 132 and the electronic components near the converting circuit 132. For yet another example, the heat accumulated in the converting circuit 132 may cause heat interference with the battery 133, which in turn brings about abnormality of charge and discharge of the battery 133. For still another example, the heat accumulated in the converting circuit 132 may raise temperature of the device to-be-charged 130 and thus influence user experience in the charging process. For still another example, the heat accumulated in the converting circuit 132 may result in short circuit of the converting circuit 132 itself, and as a result, the output voltage of the wireless receiving circuit 131 is directly applied to the battery 133 and causes abnormality of charging. In case that the battery 133 is charged with overvoltage for a long time, explosion of the battery 133 may even occur, thus putting users at risk.

In order to solve the above problems, a wireless charging system is provided in implementations of the disclosure. In the wireless charging system, a wireless charging device and a device to-be-charged can conduct wireless communication. In addition, a transmission power of the wireless charging device can be adjusted according to feedback information of the device to-be-charged, to make the transmission power of the wireless charging device match a charging voltage and/or a charging current currently required by a battery of the device to-be-charged, or match a present charging stage of the battery of the device to-be-charged. The expression "the transmission power of the wireless charging device matches the charging voltage and/or the charging current currently required by the battery" can be understood as follows. A transmission power of an electromagnetic signal of the wireless charging device is configured such that after the electromagnetic signal is received by the wireless receiving circuit, an output voltage of a wireless receiving circuit matches the charging voltage currently required by the battery of the device to-be-charged, and/or an output current of a wireless receiving circuit matches the charging current currently required by the battery of the device to-be-charged (or the output voltage and/or the output current of the wireless receiving circuit meets requirements on charging of the battery of the device to-be-charged). In this way, in the device to-be-charged, the output voltage and/or output current of the wireless receiving circuit can be applied directly to the battery for charging (referred to as "direct charging" hereinafter), which can avoid problems such as energy loss, heating, etc. due to conversion on the output voltage and/or output current of the wireless receiving circuit conducted by the converting circuit described above.

After solving the problem of heating of the converting circuit, the main heating source during wireless charging lies in a wireless transmitting circuit (including a transmitting coil) and the wireless receiving circuit (including a receiving coil).

Taking a 20 W charging power, and a single cell having 5 V charging voltage and 4 A charging current as an example, the wireless transmitting circuit can generate an electromagnetic signal based on the 5 V charging voltage and the 4 A charging current. Accordingly, the wireless receiving circuit converts the electromagnetic signal into a 5 V output voltage and a 4 A output current. Such a charging manner of low voltage and large current will result in a large quantity of heat produced during electrical energy transmission between the wireless transmitting circuit and the wireless receiving circuit.

In order to reduce heating of the wireless transmitting circuit and the wireless receiving circuit, the above direct charging will be optimized in implementations of the disclosure. A step-down circuit is provided between the wireless receiving circuit and the battery, and an output voltage of the step-down circuit is taken as a charging voltage of the battery. Still taking the 20 W charging power, and the single cell having 5 V charging voltage and 4 A charging current as an example, in order to meet requirements on charging voltage of the battery, the output voltage and an output current of the step-down circuit need to be maintained at 5 V and 4 A respectively. Supposing the step-down circuit is a half voltage circuit, the voltage and the current before decreasing are respectively 10 V and 2 A. As such, the wireless transmitting circuit generates an electromagnetic signal based on the 10 V voltage and the 2 A current. Accordingly, the wireless receiving circuit converts the electromagnetic signal into a 10 V output voltage and a 2 A output current. Since the output current is decreased from 4 A to 2 A, heat produced during electrical energy transmission will be decreased.

Figure 2:
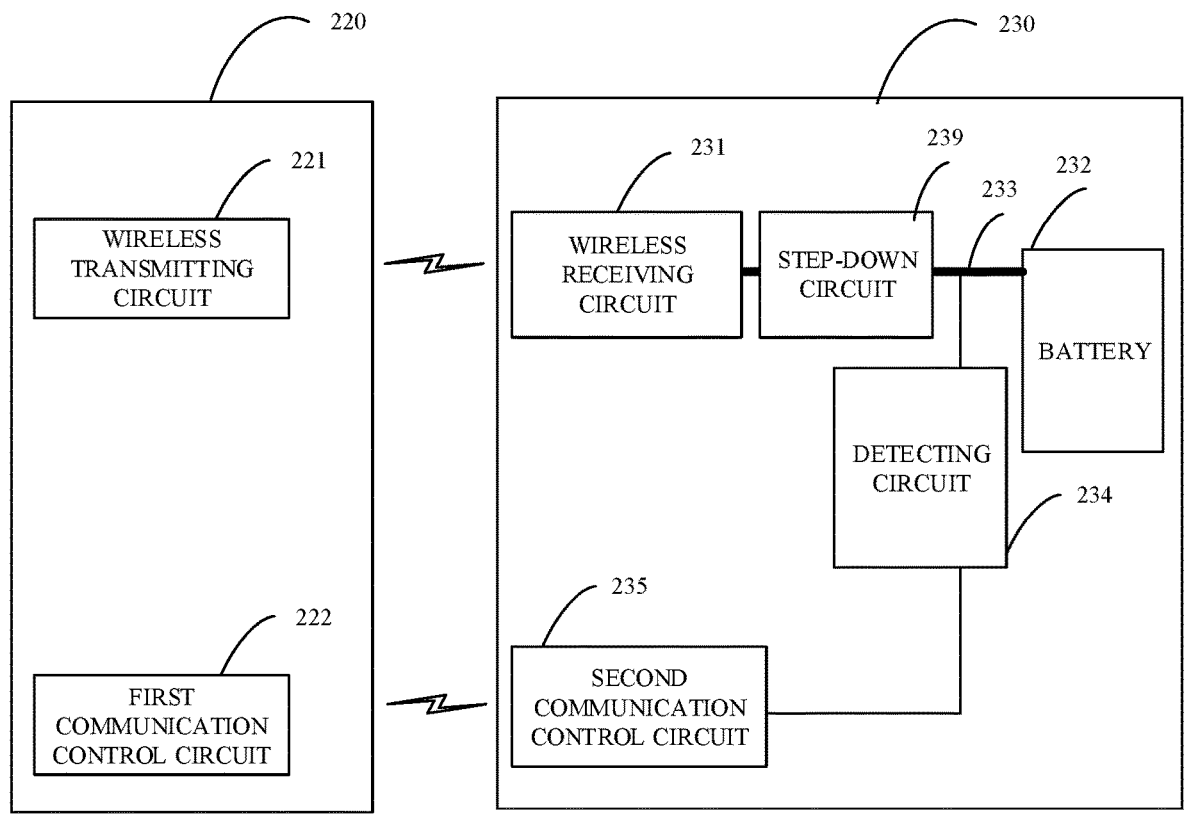
FIG. 2 is a schematic structural diagram of a wireless charging system according to an implementation of the present disclosure.

The following will describe in detail a wireless charging system 200 provided in implementations of the disclosure in conjunction with FIG. 2.

As illustrated in FIG. 2, the wireless charging system 200 in implementations of the disclosure includes a wireless charging device 220 and a device to-be-charged 230.

The wireless charging device 220 includes a wireless transmitting circuit 221 and a first communication control circuit 222. Control function of the first communication control circuit 222 can be achieved by, for instance, a micro control unit (MCU).

The wireless transmitting circuit 221 is configured to transmit an electromagnetic signal to charge the device to-be-charged 230 wirelessly. In some examples, the wireless transmitting circuit 221 can include a wireless transmission driving circuit and a transmitting coil or a transmitting antenna (not illustrated in FIG. 2). The wireless transmission driving circuit is configured to generate an AC of high frequency. The transmitting coil or the transmitting antenna can be configured to convert the AC of high frequency into the electromagnetic signal for transmission.

The first communication control circuit 222 is configured to conduct wireless communication with the device to-be-charged 230 during wireless charging. Specifically, the first communication control circuit 222 is configured to communicate with a second communication control circuit 235 of the device to-be-charged 230. The manner of communication between the first communication control circuit 222 and the second communication control circuit 235 and information exchanged between the first communication control circuit 222 and the second communication control circuit 235 are not limited herein, which will be described in detail hereinafter in conjunction with specific implementations.

The device to-be-charged 230 includes a wireless receiving circuit 231, a battery 232, a first charging channel 233, a detecting circuit 234, and the second communication control circuit 235. Control function of the second communication control circuit 235 can be achieved by, for instance, an MCU, or be cooperatively achieved by the MCU and an application processor (AP) of the device to-be-charged.

The wireless receiving circuit 231 is configured to receive the electromagnetic signal and convert the electromagnetic signal into an output voltage and an output current of the wireless receiving circuit 231. Specifically, the wireless receiving circuit 231 includes a receiving coil or a receiving antenna (not illustrated in FIG. 2) and a shaping circuit (such as a rectifying circuit and/or a filtering circuit) coupled with the receiving coil and the receiving antenna. The receiving antenna or the receiving coil is configured to convert the electromagnetic signal into an AC. The shaping circuit is configured to convert the AC into the output voltage and the output current of the wireless receiving circuit 231.

It should be noted that, the form of the shaping circuit and the form of the output voltage and the output current of the wireless receiving circuit 231 obtained after processing of the shaping circuit are not limited herein.

In some examples, the shaping circuit can include the rectifying circuit and the filtering circuit. The output voltage of the wireless receiving circuit 231 can be a steady voltage obtained after filtering. In another example, the shaping circuit can include the rectifying circuit. The output voltage of the wireless receiving circuit 231 can be a pulsating waveform voltage obtained after rectification. The pulsating waveform voltage can be applied directly to the battery 232 of the device to-be-charged 230 to charge the battery 232. The manner in which the output voltage of the wireless receiving circuit 231 is adjusted to the pulsating waveform voltage can be various, for example, the filtering circuit of the wireless receiving circuit 231 can be removed with only the rectifying circuit left.

It can be understood that, the output current of the wireless receiving circuit 231 can be used for charging the battery 232 in an intermittent manner. Period of the output current of the wireless receiving circuit 231 can vary with frequency of an AC input (such as an AC power grid) into the wireless charging system 200. For instance, frequency corresponding to the period of the output current of the wireless receiving circuit 231 is N or 1/N times (N is a positive integer) of frequency of a power grid. In addition, when the output current of the wireless receiving circuit 231 is used for charging the battery 232 in an intermittent manner, current waveform corresponding to the output current of the wireless receiving circuit 231 can include one pulse or one group of pulses synchronized with the power grid. Compared with a conventional constant direct current (DC), the magnitude of such pulsating voltage or pulsating current changes periodically, which can reduce lithium precipitation of a lithium battery and prolong service life of a battery. In addition, the pulsating voltage or pulsating current is beneficial to reducing polarization effect of the battery, increasing charging speed, and reducing heating of the battery, thereby ensuring safety and reliability in charging of the device to-be-charged.

The first charging channel 233 is provided with a step-down circuit 239. The step-down circuit 239 is configured to receive the output voltage of the wireless receiving circuit 231 and decrease the output voltage of the wireless receiving circuit 231 to obtain an output voltage and an output current of the first charging channel 233, and the battery 232 can be charged according to the output voltage and the output current of the first charging channel 233.

The step-down circuit 239 can be implemented in various manners. As an implementation, the step-down circuit 239 is a Buck circuit. As another implementation, the step-down circuit 239 is a charge pump. The charge pump is composed of multiple switch components. Heat produced when current flows through the multiple switch components is small, almost the same as heat produced when current flows directly through a wire. Therefore, by adopting the charge pump as the step-down circuit, not only can voltage be decreased, but also heating is low.

The detecting circuit 234 is configured to detect a voltage and/or a current in the first charging channel 233. The voltage and/or the current in the first charging channel 233 can refer to a voltage and/or a current between the wireless receiving circuit 231 and the step-down circuit 239, that is, the output voltage and/or the output current of the wireless receiving circuit 231. The voltage and/or the current in the first charging channel 233 can also refer to a voltage and/or a current between the step-down circuit 239 and the battery 232, that is, the output voltage and/or the output current of the first charging channel 233 (in this implementation, the output voltage and/or the output current of the first charging channel 233 is a charging voltage and/or a charging current of the battery 232).

In some examples, the detecting circuit 234 includes a voltage detecting circuit and a current detecting circuit. The voltage detecting circuit is configured to sample the voltage in the first charging channel 233 and transmit sampled voltage value to the second communication control circuit 235. In some examples, the voltage detecting circuit is configured to sample the voltage in the first charging channel 233 in a series-voltage division manner. The current detecting circuit is configured to sample the current in the first charging channel 233 and transmit sampled current value to the second communication control circuit 235. In some examples, the current detecting circuit is configured to sample the current in the first charging channel 233 via a current sensing resistor and a current detector.

The second communication control circuit 235 is configured to conduct wireless communication with the first communication control circuit 222 according to the voltage and/or the current in the first charging channel 233 detected by the detecting circuit 234, whereby the first communication control circuit 222 adjusts a transmission power of the wireless transmitting circuit 221 to make the transmission power of the wireless transmitting circuit 221 match the charging voltage and/or the charging current currently required by the battery 232.

The expression "the transmission power of the wireless transmitting circuit 221 matches the charging voltage and/or the charging current currently required by the battery 232" can be comprehended as follows. A transmission power of the electromagnetic signal of the second communication control circuit 235 is configured such that the output voltage and/or the output current of the first charging channel 233 matches the charging voltage and/or the charging current currently required by the battery 232, or the transmission power of the electromagnetic signal of the second communication control circuit 235 is configured such that the output voltage and/or the output current of the first charging channel 233 meets requirements on charging of the battery 232 (including requirements on charging voltage and/or charging current of the battery 232).

In other words, the second communication control circuit 235 is configured to conduct wireless communication with the first communication control circuit 222 according to the voltage and/or the current in the first charging channel detected by the detecting circuit 234, whereby the first communication control circuit 222 adjusts the transmission power of the wireless transmitting circuit 221 to make the output voltage and/or the output current of the first charging channel 233 meet requirements on charging of the battery 232 in at least one of a trickle charging stage, a constant-voltage charging stage, and a constant-current charging stage.

In other words, the second communication control circuit 235 is configured to conduct wireless communication with the first communication control circuit 222 according to the voltage and/or the current in the first charging channel detected by the detecting circuit 234, whereby the first communication control circuit 222 conducts a constant-voltage control and/or a constant-current control on charging of the battery 232 by adjusting the transmission power of the wireless transmitting circuit 221.

The charging process of the battery can include at least one of the trickle charging stage, the constant-voltage charging stage, and the constant-current charging stage.

In terms of conducting wireless communication with the first communication control circuit 222 according to the voltage and/or the current in the first charging channel 233 detected by the detecting circuit, whereby the first communication control circuit 222 adjusts the transmission power of the wireless transmitting circuit 221 according to the voltage and/or the current in the first charging channel 233, the second communication control circuit 235 is configured to: in the trickle charging stage of the battery 232, conduct wireless communication with the first communication control circuit 222 according to the voltage and/or the current in the first charging channel 233 detected by the detecting circuit 234, whereby the first communication control circuit 222 adjusts the transmission power of the wireless transmitting circuit 221 to make the output current of the first charging channel 233 match a charging current corresponding to the trickle charging stage (or to make the output current of the first charging channel 233 meet requirements on charging current of the battery 232 in the trickle charging stage).

For example, the charging current corresponding to the trickle charging stage is 1 A. When the battery 232 is in the trickle charging stage, the output current of the wireless receiving circuit 231 can be detected in real time by the detecting circuit 234. When the output current of the wireless receiving circuit 231 is larger than 1 A, the second communication control circuit 235 can communicate with the first communication control circuit 222, whereby the first communication control circuit 222 adjusts the transmission power of the wireless transmitting circuit 221 to make the output current of the first charging channel 233 return to 1 A.

In terms of conducting wireless communication with the first communication control circuit 222 according to the voltage and/or the current in the first charging channel 233 detected by the detecting circuit 234, whereby the first communication control circuit 222 adjusts the transmission power of the wireless transmitting circuit 221 according to the voltage and/or the current in the first charging channel 233, the second communication control circuit 235 is configured to: in the constant-voltage charging stage of the battery 232, conduct wireless communication with the first communication control circuit 222 according to the voltage and/or the current in the first charging channel 233 detected by the detecting circuit 234, whereby the first communication control circuit 222 adjusts the transmission power of the wireless transmitting circuit 221 to make the output voltage of the first charging channel 233 match a charging voltage corresponding to the constant-voltage charging stage (or to make the output voltage of the first charging channel 233 meet requirements on charging voltage of the battery 232 in the constant-voltage charging stage).

For example, the charging voltage corresponding to the constant-voltage charging stage is 5 V. When the battery 232 is in the constant-voltage charging stage, the output voltage of the first charging channel 233 can be detected in real time by the detecting circuit. When the output voltage of the first charging channel 233 is lower than 5 V, the second communication control circuit 235 can communicate with the first communication control circuit 222, whereby the first communication control circuit 222 adjusts the transmission power of the wireless transmitting circuit 221 to make the output voltage of the first charging channel 233 return to 5 V. There may be many reasons for change in the output voltage of the first charging channel 233, which is not limited herein. For instance, transmission of an electromagnetic signal between the wireless transmitting circuit 221 and the wireless receiving circuit 231 is interfered, which results in lower efficiency in energy conversion and thus makes the output voltage of the first charging channel 233 lower than 5 V.

In terms of conducting wireless communication with the first communication control circuit 222 according to the voltage and/or the current in the first charging channel 233 detected by the detecting circuit, whereby the first communication control circuit 222 adjusts the transmission power of the wireless transmitting circuit 221 according to the voltage and/or the current in the first charging channel 233, the second communication control circuit 235 is configured to: in the constant-current charging stage of the battery 232, conduct wireless communication with the first communication control circuit 222 according to the voltage and/or the current in the first charging channel 233 detected by the detecting circuit 234, whereby the first communication control circuit 222 adjusts the transmission power of the wireless transmitting circuit 221 to make the output current of the first charging channel 233 match a charging current corresponding to the constant-current charging stage (or to make the output current of the first charging channel 233 meet requirements on charging current of the battery 232 in the constant-current charging stage).

For example, the charging current corresponding to the constant-current charging stage is 2 A. When the battery 232 is in the constant-current charging stage, the output current of the first charging channel 233 can be detected in real time by the detecting circuit. When the output current of the first charging channel 233 is smaller than 2 A, the second communication control circuit 235 can communicate with the first communication control circuit 222, whereby the first communication control circuit 222 adjusts the transmission power of the wireless transmitting circuit 221 to make the output current of the first charging channel 233 return to 2 A. There may be many reasons for change in the output current of the first charging channel 233, which is not limited herein. For instance, transmission of an electromagnetic signal between the wireless transmitting circuit 221 and the wireless receiving circuit 231 is interfered, which results in lower efficiency in energy conversion and thus makes the output current of the first charging channel 233 smaller than 2 A.

It should be noted that, the constant-current charging stage or the constant-current stage referred to herein does not require that the charging current remain completely constant, and may be, for example, a peak value (that is, peak current) or an average value of the charging current remaining constant within a certain time period. Practically, in the constant-current charging stage, a multi-stage constant current charging manner is usually adopted for charging.

Multi-stage constant current charging can include N constant-current stages, where N is an integer not less than two (N>=2). In the multi-stage constant current charging, a first stage of charging begins with a pre-determined charging current. The N constant-current stages of the multi-stage constant current charging are executed in sequence from the first stage to the $N^{th}$ stage. When a previous constant-current stage ends and a next constant-current stage begins, the peak value or average value of a pulsating waveform current may decrease. When a voltage of the battery reaches a threshold of charging cut-off voltage, the multi-stage constant current charging proceeds to a subsequent constant-current stage, that is, the previous constant-current stage ends and the next constant-current stage begins. Current conversion between two adjacent constant-current stages may be gradual or in a step-like manner.

In implementations of the present disclosure, the device to-be-charged can be a terminal. The "terminal" can include but is not limited to a device coupled via a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or other data connection lines or network connection lines. Examples of the wireless interface may include, but are not limited to, a wireless interface with a cellular network, a wireless local area network (WLAN), a digital television network (such as a digital video broadcasting-handheld (DVB-H) network), a satellite network, an amplitude modulation-frequency modulation (AM-FM) broadcast transmitter, and/or with other communication terminals. A communication terminal configured to communicate via a wireless interface may be called a "wireless communication terminal", a "wireless terminal", and/or a "mobile terminal". Examples of a mobile terminal may include, but are not limited to, a satellite or cellular telephone, a personal communication system (PCS) terminal capable of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and a conventional laptop or a handheld receiver or other electronic devices equipped with radio telephone transceiver. In addition, in implementations of the present disclosure, the device to-be-charged or terminal can also include a power bank. The power bank can be configured to be charged by an adaptor and thus store energy to charge other electronic devices.

The manner and order of communication between the wireless charging device 220 and the device to-be-charged 230 are not limited herein.

In some examples, the wireless communication between the wireless charging device 220 and the device to-be-charged 230 (or between the second communication control circuit 235 and the first communication control circuit 222) is a one-way wireless communication.

For example, during wireless charging of the battery 232, it can be specified that the device to-be-charged 230 is an initiator of communication and the wireless charging device 220 is a receiver of communication. Exemplarily, in the constant-current charging stage of the battery, the device to-be-charged 230 can detect in real time the charging current of the battery 232 (that is, the output current of the wireless receiving circuit 231) through the detecting circuit 234. When the charging current of the battery 232 does not match the present charging stage of the battery, the device to-be-charged 230 can send adjustment information to the wireless charging device 220 to instruct the wireless charging device 220 to adjust the transmission power of the wireless transmitting circuit 221.

In some implementations, the wireless communication between the wireless charging device 220 and the device to-be-charged 230 (or between the second communication control circuit 235 and the first communication control circuit 222) is a two-way wireless communication. The two-way wireless communication generally requires that the receiver send response information to the initiator after receiving communication request initiated by the initiator. Two-way communication mechanism can make communication safer.

Description above does not limit master-slave relationship between the wireless charging device 220 (or the first communication control circuit 222 of the wireless charging device 220) and the device to-be-charged 230 (or the second communication control circuit 235 of the device to-be-charged 230). That is to say, any one of the wireless charging device 220 and the device to-be-charged 230 can function as a master device to initiate a two-way communication, and correspondingly the other one of the wireless charging device 220 and the device to-be-charged 230 can function as a slave device to make a first response or a first reply to the communication initiated by the master device. Optionally, the master device and the slave device can be determined by comparing link states between the wireless charging device 220 and the device to-be-charged 230. For example, suppose a wireless link in which the wireless charging device 220 sends information to the device to-be-charged 230 is an uplink and a wireless link in which the device to-be-charged 230 sends information to the wireless charging device 220 is a downlink. When the uplink is of higher quality, the wireless charging device 220 can be determined as the master device of communication. When the downlink is of higher quality, the device to-be-charged 230 can be determined as the master device of communication.

The manner in which the two-way communication between the wireless charging device 220 and the device to-be-charged 230 is implemented is not limited herein. That is to say, any one of the wireless charging device 220 and the device to-be-charged 230 can function as the master device to initiate the two-way communication, and correspondingly the other one of the wireless charging device 220 and the device to-be-charged 230 can function as the slave device to make the first response or the first reply to the communication initiated by the master device. Besides, the master device can make a second response to the first response or the first reply of the slave device, and as such, the master device and the slave device complete one communication negotiation.

The master device can make the second response to the first response or the first reply of the slave device as follows. The master device receives from the slave device the first response or the first reply to the communication and makes the second response to the first response or the first reply of the slave device.

The master device can also make the second response to the first response or the first reply of the slave device as follows. When the master device fails to receive from the slave device the first response or the first reply to the communication within a preset time period, the master device can still make the second response to the first response or the first reply made by the slave device.

In some examples, after the device to-be-charged 230, as the master device, initiates the communication and the wireless charging device 220, as the slave device, makes the first response or the first reply to the communication initiated by the master device, it can be considered that the wireless charging device 220 and the device to-be-charged 230 have complete a communication negotiation without requiring the device to-be-charged 230 to make the second response to the first response or the first reply of the wireless charging device 220.

The manner of wireless communication between the first communication control circuit 222 of the wireless charging device 220 and the second communication control circuit 235 of the device to-be-charged 230 is not limited herein. As an implementation, the first communication control circuit is configured to conduct wireless communication with the second communication control circuit based on Bluetooth, wireless fidelity (Wi-Fi), or backscatter modulation (or power load modulation).

As pointed above, during wireless charging, the second communication control circuit 235 can be configured to conduct the wireless communication with the first communication control circuit 222 according to the voltage and/or the current of the first charging channel detected by the detecting circuit 234, whereby the first communication control circuit 222 adjusts the transmission power of the wireless transmitting circuit 221. However, contents communicated between the first communication control circuit 222 and the second communication control circuit 235 is not limited herein.

As an example, the second communication control circuit 235 is configured to send to the first communication control circuit 222 the output voltage and/or the output current of the first charging channel detected by the detecting circuit 234. In addition, the second communication control circuit 235 can be further configured to send battery-state information to the first communication control circuit 222. The battery-state information includes a present power and/or a present voltage of the battery 232 of the device to-be-charged 230. The first communication control circuit 222 can determine the present charging stage of the battery 232 according to the battery-state information, to further determine a target charging voltage and/or a target charging current that matches the charging voltage and/or the charging current currently required by the battery 232. Then the first communication control circuit 222 can compare the output voltage and/or the output current of the first charging channel 233 received from the second communication control circuit 235 with the above target charging voltage and/or target charging current to determine whether the output voltage and/or the output current of the first charging channel 233 matches the charging voltage and/or the charging current currently required by the battery 232. When the output voltage and/or the output current of the first charging channel 233 does not match the charging voltage and/or the charging current currently required by the battery 232, the first communication control circuit 222 can adjust the transmission power of the wireless transmitting circuit 221 until the output voltage and/or the output current of the first charging channel 233 matches the charging voltage and/or the charging current currently required by the battery 232.

As another example, the second communication control circuit 235 is configured to send adjustment information to the first communication control circuit 222 to instruct the first communication control circuit 222 to adjust the transmission power of the wireless transmitting circuit 221. For example, the second communication control circuit 235 can instruct the first communication control circuit 222 to increase the transmission power of the wireless transmitting circuit 221. For another example, the second communication control circuit 235 can instruct the first communication control circuit 222 to reduce the transmission power of the wireless transmitting circuit 221. Specifically, the wireless charging device 220 can set the transmission power of the wireless transmitting circuit 221 to have multiple grades. Each time the first communication control circuit 222 receives the adjustment information, the first communication control circuit 222 adjusts the transmission power of the wireless transmitting circuit 221 by one grade until the output voltage and/or the output current of the first charging channel 233 matches the charging voltage and/or the charging current currently required by the battery 232.

Besides the above communication content, the first communication control circuit 222 and the second communication control circuit 235 can also be configured to exchange other types of information communicated. In some examples, the first communication control circuit 222 and the second communication control circuit 235 can exchange information for safety protection, abnormality detection, or fault handling, such as temperature information of the battery 232, information indicative of over-voltage protection or over-current protection, etc., or power-delivery efficiency information (for indicating efficiency in power delivery between the wireless transmitting circuit 221 and the wireless receiving circuit 231).

For example, when the temperature of the battery 232 is excessively high, the first communication control circuit 222 and/or the second communication control circuit 235 can control a charging loop to a protection state, such as controlling the charging loop to stop the wireless charging. For another example, after receiving the information indicative of over-voltage protection or over-current protection from the second communication control circuit 235, the first communication control circuit 222 can reduce the transmission power, or control the wireless transmitting circuit 221 to stop working. For yet another example, after receiving the power-delivery efficiency information from the second communication control circuit 235, the first communication control circuit 222 can control the wireless transmitting circuit 221 to stop working if power-delivery efficiency is lower than a preset threshold and notify user of the event. Exemplarily, the fact that the power-delivery efficiency is excessively low can be displayed via a display screen, or be indicated by an indicator lamp in order for the user to adjust wireless charging environment.

In some examples, the first communication control circuit 222 and the second communication control circuit 235 can be configured to exchange other types of information for adjusting the transmission power of the wireless transmitting circuit 221, such as the temperature information of the battery 232, information indicative of a peak value or an average value of the voltage in the first charging channel 233, information indicative a peak value or an average value of the current in the first charging channel 233, the power-delivery efficiency information (indicative of efficiency in power delivery between the wireless transmitting circuit 221 and the wireless receiving circuit 231), etc.

For instance, the second communication control circuit 235 can send the power-delivery efficiency information to the first communication control circuit 222. The first communication control circuit 222 can be further configured to determine an adjustment range of the transmission power of the wireless transmitting circuit 221 according to the power-delivery efficiency information. Specifically, when the power-delivery efficiency information indicates that the efficiency in power delivery between the wireless transmitting circuit 221 and the wireless receiving circuit 231 is low, the first communication control circuit 222 can increase the adjustment range of the transmission power of the wireless transmitting circuit 221 to make the transmission power of the wireless transmitting circuit 221 reach promptly a target power.

For another instance, when the output voltage and/or the output current of the wireless receiving circuit 231 is a pulsating waveform voltage and/or a pulsating waveform current, the second communication control circuit 235 can send at least one of the information indicative of a peak value or an average value of the output voltage of the first charging channel 233 and the information indicative of a peak value or an average value of the output current of the first charging channel 233 to the first communication control circuit 222. The first communication control circuit 222 can determine whether the peak value or the average value of the output voltage and/or the output current of the first charging channel 233 matches the charging voltage and/or the charging current currently required by the battery. When the peak value or the average value of the output voltage and/or the output current of the first charging channel 233 does not match the charging voltage and/or the charging current currently required by the battery, the first communication control circuit 222 will adjust the transmission power of the wireless transmitting circuit 221.

For yet another instance, the second communication control circuit 235 can send the temperature information of the battery 232 to the first communication control circuit 222. When a temperature of the battery 232 is excessively high, the first communication control circuit 222 will reduce the transmission power of the wireless transmitting circuit 221 to decrease the output current of the wireless receiving circuit 231, thereby reducing the temperature of the battery 232.

Figure 3:
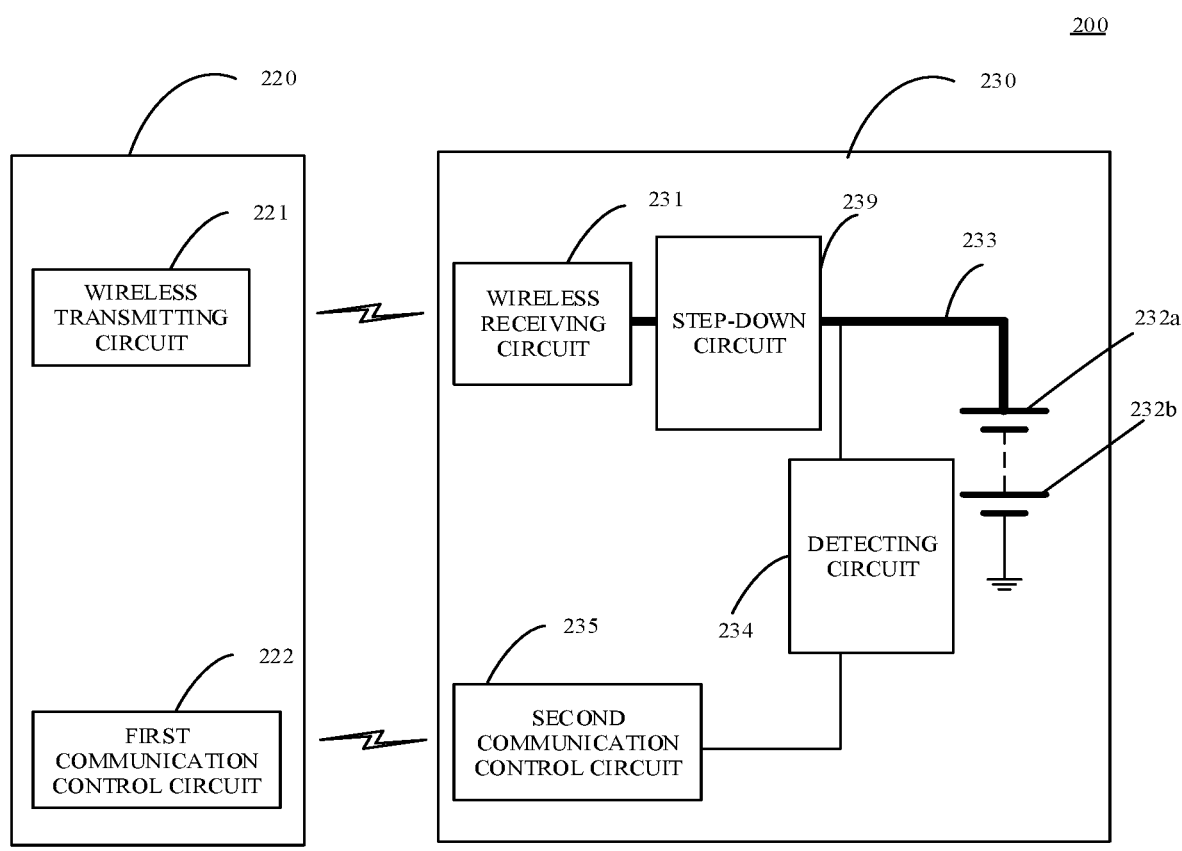
FIG. 3 is a schematic structural diagram of a wireless charging system according to another implementation of the present disclosure.

The battery 232 of the device to-be-charged 230 in implementations of the disclosure may include one single cell, or may include N cells coupled in series (N is a positive integer greater than one). For example, N=2. As illustrated in FIG. 3, the battery 232 includes Cell 232a and Cell 232b which are coupled in series. Taking a 20 W charging power and one single cell with a 5 V charging voltage as an example, in order to meet requirements on charging voltage of two cells coupled in series, the output voltage and the output current of the first charging channel 233 need to remain 10 V and 2 A respectively. In this way, the wireless transmitting circuit generates an electromagnetic signal based on a 10 V voltage and a 2 A current, and accordingly the wireless receiving circuit converts the electromagnetic signal into a 10 V output voltage and a 2 A output current. Since the current has been decreased from 4 A to 2 A, heat produced during electrical energy transmission will be reduced accordingly. In FIG. 3, N=2. It is also possible that N=3 or N≥3 and is a positive integer. A greater number of cells coupled in series will result in less heat produced when electrical energy flows through the wireless transmitting circuit 221 and the wireless receiving circuit 231.

It is to be noted that, implementations illustrated in FIG. 2 and FIG. 3 can be implemented independently or be combined with each other. For example, the device to-be-charged includes the step-down circuit 239 illustrated in FIG. 2, and the battery 232 of the device to-be-charged includes N cells coupled in series (N is a positive integer greater than one). Still taking a 20 W charging power and a 5 V charging voltage of one single cell as an example, in order to meet requirements on charging voltage of two cells coupled in series, the output voltage and the output current of the step-down circuit 239 need to be maintained at 10 V and 2 A respectively. Suppose the step-down circuit 239 is a half voltage circuit, then the voltage and the current before decreasing are 20 V and 1 A respectively. In this way, the wireless transmitting circuit generates an electromagnetic signal based on the 20 V voltage and the 1 A current, and accordingly the wireless receiving circuit converts the electromagnetic signal into a 20 V output voltage and a 1 A output current. Since the current has been decreased from 4 A to 1 A, heat produced during electrical energy transmission can be further reduced.

As pointed above, the wireless charging device 220 provided herein can adjust continuously the transmission power of the wireless transmitting circuit 221 to make the output voltage and/or the output current of the first charging channel 233 match the charging voltage and/or the charging current currently required by the battery 232. The manner in which the transmission power of the wireless transmitting circuit 221 is adjusted is not limited herein. As an example, the first communication control circuit 222 can communicate with a power supply device 210 to adjust an output voltage and/or an output current of the power supply device 210, so as to adjust the transmission power of the wireless transmitting circuit 221. As another example, the first communication control circuit 222 is configured to adjust an amount of power extracted by the wireless transmitting circuit 221 from a maximum output power provided by the power supply device 210 to adjust the transmission power of the wireless transmitting circuit 221. As another example, the wireless charging device 220 can receive directly an AC (such as a 220 V AC). According to feedback of the second communication control circuit 235, the first communication control circuit 222 can convert directly the AC into a voltage and/or a current required. In the following, the manner in which the transmission power of the wireless transmitting circuit 221 is adjusted will be elaborated with reference to FIG. 4 to FIG. 6.

Figure 4:
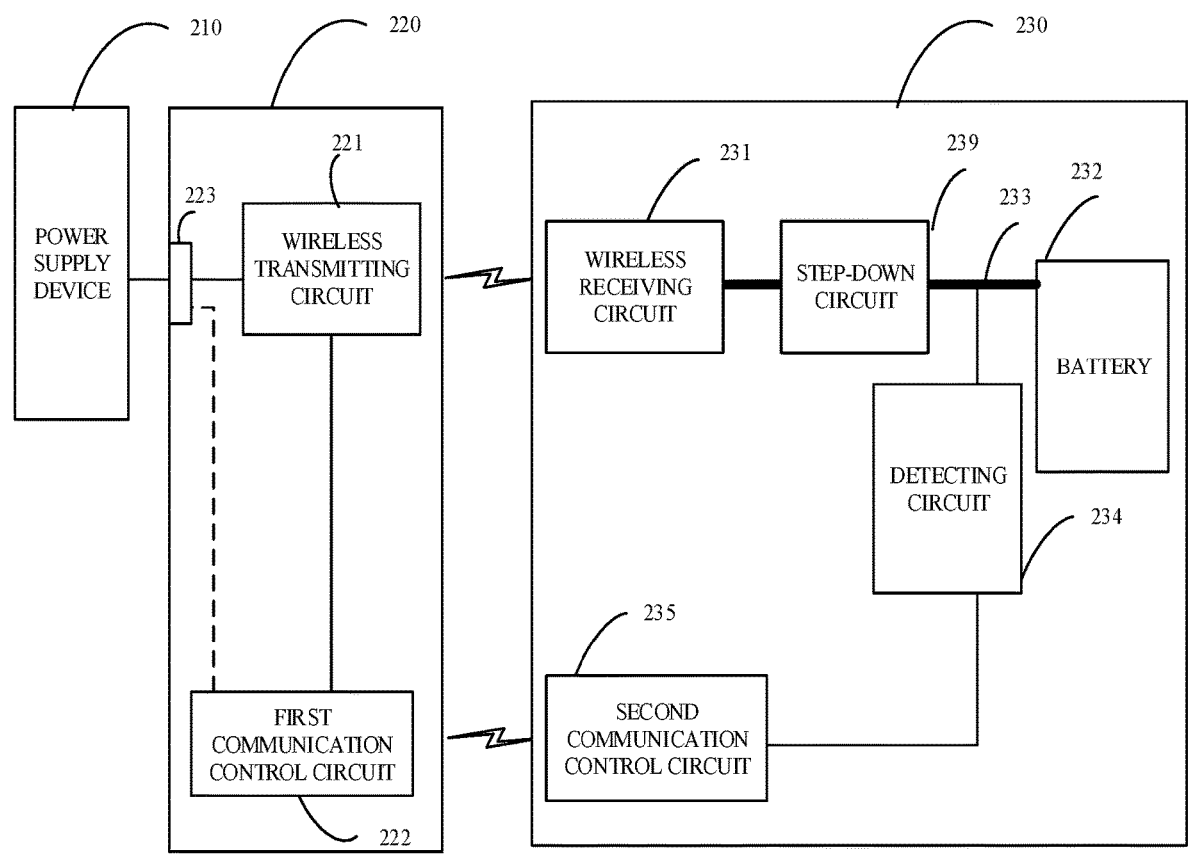
FIG. 4 is a schematic structural diagram of a wireless charging system according to another implementation of the present disclosure.

FIG. 4 illustrates an implementation of the manner in which the transmission power of the wireless transmitting circuit 221 is adjusted. As illustrated in FIG. 4, the wireless charging device 220 further includes a charging interface 223. The charging interface 223 can be coupled with an external power supply device 210. The wireless transmitting circuit 221 is further configured to generate the electromagnetic signal according to an output voltage and an output current of the power supply device 210. The first communication control circuit 222 is further configured to communicate with the power supply device 210 to negotiate a maximum output power of the power supply device 210, and configured to adjust, during wireless charging, an amount of power extracted by the wireless transmitting circuit 221 from the maximum output power, so as to adjust the transmission power of the wireless transmitting circuit 221.

In this implementation, the first communication control circuit 222 communicates with the power supply device 210 with adjustable output power to negotiate the maximum output power of the power supply device 210. After negotiation is completed, the power supply device 210 provides an output voltage and an output current to the wireless charging device 220 according to the maximum output power. During charging, the first communication control circuit 222 extracts a certain amount of power from the maximum output power for wireless charging according to actual needs. In other words, in implementations of the disclosure, control on adjustment of the transmission power of the wireless transmitting circuit 221 is allotted to the first communication control circuit 222. As such, the first communication control circuit 222 can adjust the transmission power of the wireless transmitting circuit 221 immediately after receiving feedback information from the device to-be-charged 230, which has advantages of high adjusting speed and high efficiency.

The manner in which the first communication control circuit 222 extracts some amount of power from the maximum output power of the power supply device 210 is not limited herein. For example, a voltage converting circuit (such as a power adjusting circuit) can be disposed inside the wireless charging device 220. The voltage converting circuit can be coupled with the transmitting coil or the transmitting antenna to adjust power received by the transmitting coil or the transmitting antenna. The voltage converting circuit can include, for example, a pulse width modulation (PWM) controller and a switch component. The first communication control circuit 222 can adjust the transmission power of the wireless transmitting circuit 221 by adjusting a duty cycle of a control signal transmitted by the PWM controller and/or by controlling switch frequency of the switch component.

It should be noted that, alternatively, in the implementation illustrated in FIG. 4, the power supply device 210 can also output a constant and high output power (such as 40 W) directly. In this way, the first communication control circuit 222 can adjust directly the amount of power extracted by the wireless transmitting circuit 221 from such constant output power of the power supply device 210 without negotiating with the power supply device 210 the maximum output power of the power supply device 210.

The type of the power supply device 210 is not specifically limited herein. For example, the power supply device 210 can be an adaptor, a power bank, a vehicle charger, a computer, or the like.

The type of the charging interface 223 is not specifically limited herein. In some implementations, the charging interface 223 is a USB interface. The USB interface can be, for example, a USB 2.0 interface, a micro USB interface, or a USB TYPE-C interface. Alternatively, in other implementations, the charging interface 223 can also be a lightning interface, or other types of parallel interface and/or serial interface that is used for charging.

The manner of communication between the first communication control circuit 222 and the power supply device 210 is no limited herein. As an example, the first communication control circuit 222 can be coupled with and communicate with the power supply device 210 via another communication interface other than the charging interface. As another example, the first communication control circuit 222 can communicate with the power supply device 210 in a wireless manner. For example, the first communication control circuit 222 can conduct near field communication (NFC) with the power supply device 210. As yet another example, the first communication control circuit 222 can communicate with the power supply device 210 via the charging interface 223 without providing any extra communication interface or another wireless communication module, which can simplify the implementation of the wireless charging device 220. For instance, the charging interface 223 is a USB interface. The first communication control circuit 222 can communicate with the power supply device 210 via a data line (such as a D+ line and/or a D− line) of the USB interface. For another instance, the charging interface 223 is a USB interface supporting a power delivery (PD) communication protocol (such as the USB TYPE-C interface). The first communication control circuit 222 can communicate with the power supply device 210 based on the PD communication protocol.

The manner in which the power supply device 210 adjusts its own output power is not limited herein. For example, the power supply device 210 can be provided with a voltage feedback loop and a current feedback loop to adjust the output voltage and/or the output current of the power supply device 210 according to actual needs.

Figure 5:
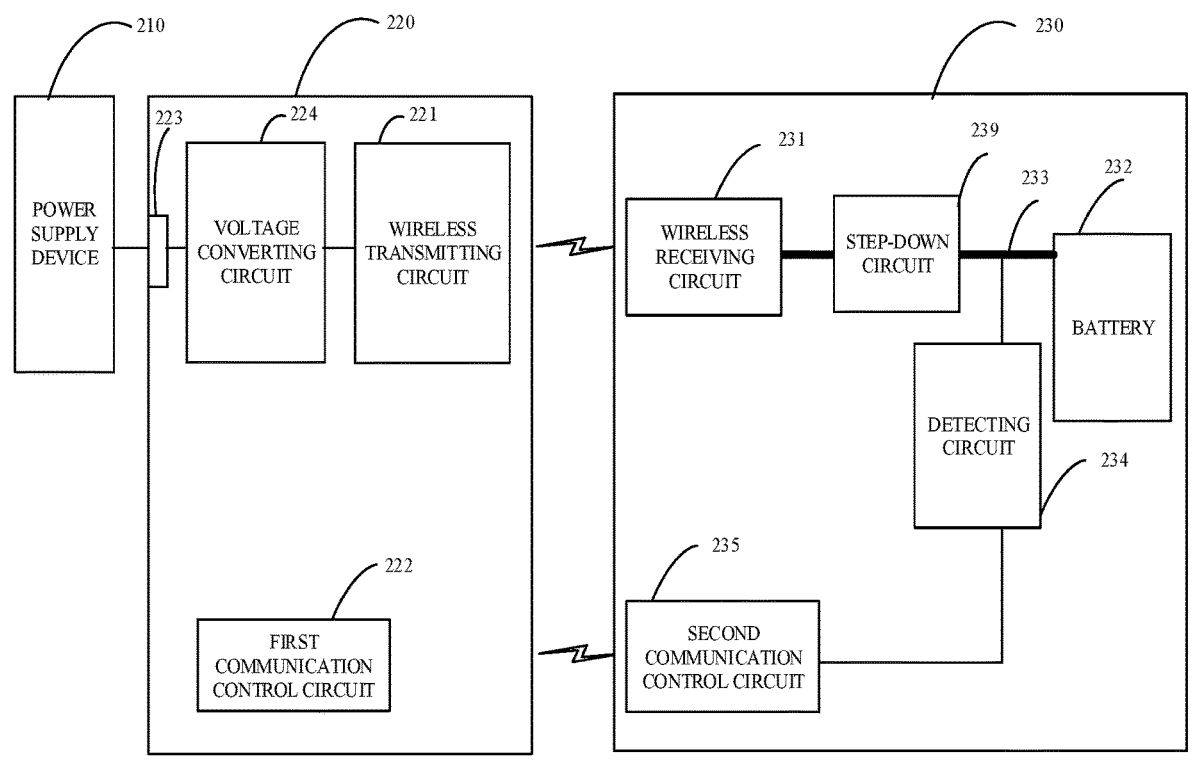
FIG. 5 is a schematic structural diagram of a wireless charging system according to another implementation of the present disclosure.

FIG. 5 illustrates another implementation of the manner in which the transmission power of the wireless transmitting circuit 221 is adjusted. Different from FIG. 4, in FIG. 5, instead of controlling the maximum output power of the power supply device 210, an output power of the power supply device 210 is controlled in a relatively accurate manner, to make the output power of the power supply device 210 meet present power requirements. In addition, different from FIG. 4, in FIG. 5, control on adjustment of the transmission power of the wireless transmitting circuit 221 is allotted to the power supply device 210, and the power supply device 210 is configured to adjust the transmission power of the wireless transmitting circuit 221 by changing the output voltage and/or output current. In such an adjusting manner, advantageously, the power supply device 210 can provide the exact amount of power required by the wireless charging device 220, and there is no waste of power. In the following, description will be given with reference to FIG. 5.

As illustrated in FIG. 5, the wireless charging device further includes a charging interface 223 and a voltage converting circuit 224. The charging interface 223 can be coupled with a power supply device 210. The voltage converting circuit 224 is configured to receive an output voltage of the power supply device 210 and convert the output voltage of the power supply device 210 to obtain an output voltage and an output current of the voltage converting circuit 224. The wireless transmitting circuit 221 is further configured to generate the electromagnetic signal according to the output voltage and the output current of the voltage converting circuit 224. The first communication control circuit 222 is further configured to communicate with the power supply device 210 to negotiate the output voltage and/or an output current of the power supply device 210.

In this implementation, energy transfer is conducted in a high-voltage and small-current manner, and such manner has high requirements on input voltage (such as 10 V or 20 V) of the wireless transmitting circuit 221. If the maximum output voltage of the power supply device 210 is unable to meet requirements on the input voltage of the wireless transmitting circuit 221, the voltage converting circuit 224 can make the input voltage of the wireless transmitting circuit 221 reach an expected input voltage. Alternatively, if the output voltage of the power supply device 210 can meet requirements on the input voltage of the wireless transmitting circuit 221, the voltage converting circuit 224 can be omitted to simplify the structure of the wireless charging device 220.

The voltage converting circuit 224 can be, for example, a step-up circuit, which is also known as a Boost circuit. A step-up factor of the voltage converting circuit 224 and a step-down factor of the step down circuit 239 depend on an output voltage that the power supply device 210 is able to provide, a charging voltage required by the battery 232, or the like. The step-up factor of the voltage converting circuit 224 may or may not be equal to the step-down factor of the step down circuit 239, which is not particularly limited herein.

As an implementation, the step-up factor of the voltage converting circuit 224 is set to be equal to the step-down factor of the step-down circuit 239. For example, the voltage converting circuit 224 is a voltage multiplier circuit configured to double the output voltage of the power supply device 210. The step-down circuit 239 is a half voltage circuit configured to decrease the output voltage of the wireless receiving circuit 231 by half.

In this implementation, the step-up factor of the voltage converting circuit 224 is set to be equal to the step-down factor of the step-down circuit 239. As such, an output voltage and an output current of the step-down circuit 239 are equal to the output voltage and the output current of the power supply device 210 respectively, which is beneficial to simplifying the structure of communication control circuits 222 and 235. As an example, the charging current required by the battery 232 is 5 A. When the second communication control circuit 235 is informed through the detecting circuit 234 that the output current of the step-down circuit 239 is 4.5 A, it is necessary to adjust the output power of the power supply device 210 to make the output current of the step-down circuit 239 reach 5 A. If the step-up factor of the voltage converting circuit 224 is not equal to the step-down factor of the step-down circuit 239, when the output power of the power supply device 210 is adjusted, it is necessary for the first communication control circuit 222 or the second communication control circuit 235 to calculate once again an adjustment range of the output power of the power supply device 210 according to a difference between the present output current of the step-down circuit 239 and an expected current. In implementations of the disclosure, the step-up factor of the voltage converting circuit 224 is set to be equal to the step-down factor of the step-down circuit 239. In this way, the second communication control circuit 235 only needs to inform the first communication control circuit 222 of increasing the output current of the step-down circuit 239 to 5 A, thereby simplifying feedback adjustment of a wireless charging path.

In the implementation illustrated in FIG. 5, the wireless charging device 220 can determine actively whether it is necessary to adjust the output voltage and/or the output current of the power supply device 210. In another example, the wireless charging device 220 can function as a "bridge" of communication between the power supply device 210 and the device to-be-charged 230 and forward information between the power supply device 210 and the device to-be-charged 230.

For example, the first communication control circuit 222 communicates with the device to-be-charged 230 during wireless charging to determine whether it is necessary to adjust the output voltage and/or the output current of the power supply device 210. When it is necessary to adjust the output voltage and/or the output current of the power supply device 210, the first communication control circuit 222 communicates with the power supply device 210 to instruct the power supply device 210 to adjust the output voltage and/or the output current of the power supply device 210.

For another example, the first communication control circuit 222 of the wireless charging device 220 conducts wireless communication with the device to-be-charged 230 during wireless charging to acquire adjustment information. The adjustment information is for instructing adjustment of the output voltage and/or the output current of the power supply device 210. The first communication control circuit 222 communicates with the power supply device 210 to send the adjustment information to the power supply device 210, whereby the power supply device 210 adjusts the output voltage and/or the output current of the power supply device according to the adjustment information.

It should be understood that, similar to the manner of communication between the wireless charging device 220 and the device to-be-charged 230, the communication between the wireless charging device 220 (or the first communication control circuit 222) and the power supply device 210 can be a one-way communication or a two-way communication and is not limited herein.

In addition, it should be understood that, the output current of the power supply device can be a constant DC, a pulsating DC, or an AC and is not limited herein.

In the implementation illustrated in FIG. 5, the first communication control circuit 222 can be coupled with the wireless transmitting circuit 221 to control the wireless transmitting circuit 221 to work, or control wireless transmitting circuit 221 to stop working when the wireless charging is abnormal. Alternatively, the first communication control circuit 222 may not be coupled with the wireless transmitting circuit 221.

Figure 6:
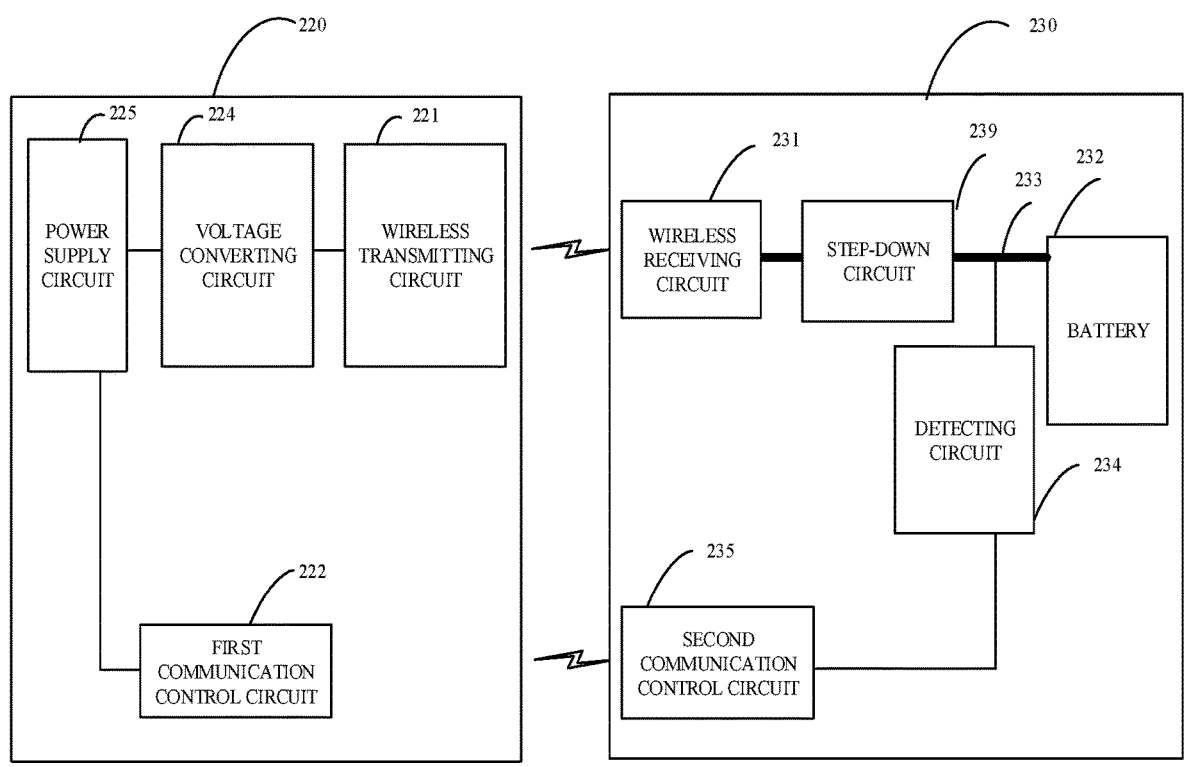
FIG. 6 is a schematic structural diagram of a wireless charging system according to another implementation of the present disclosure.

FIG. 6 illustrates another implementation of the manner in which the transmission power of the wireless transmitting circuit 221 is adjusted. Different from FIGS. 4 and 5, instead of acquiring electrical energy from the power supply device 210, the wireless charging device 220 of FIG. 6 directly converts an AC received from outside (such as mains electricity) into the electromagnetic signal.

As illustrated in FIG. 6, the wireless charging device 220 further includes a voltage converting circuit 224 and a power supply circuit 225. The power supply circuit 225 is configured to receive an AC from outside (such as mains electricity) and generate an output voltage and an output current of the power supply circuit 225 according to the AC. For example, the power supply circuit 225 can conduct rectification and/or filtering on the AC to obtain a DC or a pulsating DC and transmit the DC or the pulsating DC to the voltage converting circuit 224.

The voltage converting circuit 224 is configured to receive the output voltage of the power supply circuit 225 and convert the output voltage of the power supply circuit 225 to obtain an output voltage and an output current of the voltage converting circuit 224. The wireless transmitting circuit 221 is further configured to generate the electromagnetic signal according to the output voltage and the output current of the voltage converting circuit 224.

In this implementation, a function similar to an adaptor is integrated into the wireless charging device 220, which makes it unnecessary for the wireless charging device 220 to acquire power from an external power supply device, thus improves the integration of the wireless charging device 220, and decreases the number of components required for wireless charging.

In this implementation, energy transfer is conducted in a high-voltage and small-current manner, and such manner has high requirements on input voltage (such as 10 V or 20 V) of the wireless transmitting circuit 221. If the maximum output voltage of the power supply circuit 225 is unable to meet requirements on the input voltage of the wireless transmitting circuit 221, the voltage converting circuit 224 can make the input voltage of the wireless transmitting circuit 221 reach an expected input voltage. Alternatively, if the output voltage of the power supply circuit 225 can meet requirements on the input voltage of the wireless transmitting circuit 221, the voltage converting circuit 224 can be omitted, to simplify the structure of the wireless charging device 220.

In some implementations, the wireless charging device 220 is operable in a first wireless charging mode or in a second wireless charging mode, and a charging speed at which the wireless charging device 220 charges the device to-be-charged 230 in the first wireless charging mode is higher than in the second wireless charging mode. In other words, compared with the wireless charging device 220 working in the second wireless charging mode, the wireless charging device 220 working in the first wireless charging mode takes less time to fully charge a battery of the same capacity of the device to-be-charged 230.

The second wireless charging mode can be referred to as a normal wireless charging mode and can be, for example, a conventional wireless charging mode based on the QI standard, the PMA standard, or the A4WP standard. The first wireless charging mode can be referred to as a quick wireless charging mode. The normal wireless charging mode can refer to a wireless charging mode in which the wireless charging device 220 has a low transmission power (usually lower than 15 W, and the commonly used transmission power is 5 W or 10 W). In the normal wireless charging mode, it usually takes several hours to fully charge a battery of high capacity (such as 3000 mA). However, in the quick wireless charging mode, the transmission power of the wireless charging device 220 is relatively high (usually higher than or equal to 15 W). Compared with the normal wireless charging mode, in the quick wireless charging mode, the wireless charging device 220 can fully charge a battery of the same capacity within a substantially shorter charging period, and the charging is faster.

In some implementations, the first communication control circuit 222 conducts a two-way communication with the second communication control circuit 235 to control a transmission power of the wireless charging device 220 in the first wireless charging mode.

In some implementations, the first communication control circuit 222 conducts the two-way communication with the second communication control circuit 235 to control the transmission power of the wireless charging device 220 in the first wireless charging mode as follows. The first communication control circuit 222 conducts the two-way communication with the second communication control circuit 235 to negotiate which wireless charging mode to be used between the wireless charging device 220 and the device to-be-charged 230.

Specifically, the first communication control circuit 222 can conduct handshake communication with the second communication control circuit 235 and control the wireless charging device 220 to charge the device to-be-charged 230 in the first wireless charging mode when the handshake communication succeeds, or control the wireless charging device 220 to charge the device to-be-charged 230 in the second wireless charging mode when the handshake communication fails.

The handshake communication can refer to recognition of identities of the two communication parties. A successful handshake communication means that both the wireless charging device 220 and the device to-be-charged 230 can support or are operable in the wireless charging manner in which the transmission power is adjustable. A failed handshake communication means that at least one of the wireless charging device 220 and the device to-be-charged 230 does not support the wireless charging manner in which the transmission power is adjustable.

In the implementations of the disclosure, the wireless charging device 220 does not conduct quick wireless charging on the device to-be-charged 230 indiscriminately in the first wireless charging mode. Instead, the wireless charging device 220 conducts a two-way communication with the device to-be-charged 230 to negotiate whether the wireless charging device 220 can perform quick wireless charging on the device to-be-charged 230 in the first wireless charging mode, which can make a charging process safer.

Specifically, the first communication control circuit 222 conducts the two-way communication with the second communication control circuit 235 to negotiate which wireless charging mode to be used between the wireless charging device 220 to charge the device to-be-charged 230 as follows. The first communication control circuit 222 sends a first instruction to the second communication control circuit 235, where the first instruction is used for asking the device to-be-charged 230 whether to enable the first wireless charging mode. The first communication control circuit 222 receives from the second communication control circuit 235 a reply instruction of the first instruction, where the reply instruction is used for indicating whether the device to-be-charged 230 agrees to enable the first wireless charging mode. When the device to-be-charged 230 agrees to enable the first wireless charging mode, the first communication control circuit 222 controls the wireless charging device 220 to charge the device to-be-charged 230 in the first wireless charging mode.

Besides determining the wireless charging mode to be used by negotiating, the first communication control circuit 222 can further select or switch wireless charging mode according to other factors. Exemplarily, the first communication control circuit 222 can further control the wireless charging device 220 to charge the battery 232 in the first wireless charging mode or in the second wireless charging mode according to the temperature of the battery 232.

For example, when the temperature is lower than a preset first threshold, such as 5° C. or 10° C., the first communication control circuit 222 can control the wireless charging device 220 to adopt the second wireless charging mode for normal charging. When the temperature is higher than or equal to the first threshold, the first communication control circuit 222 can control the wireless charging device 220 to adopt the first wireless charging mode for quick charging. In addition, when the temperature is higher than a high-temperature threshold, such as 50° C., the first communication control circuit 222 can control the wireless charging device 220 to stop charging.

It should be noted that, the wireless charging manner in which the transmission power is adjustable provided herein can be adopted to control one or more of the charging stages of the battery 232. For example, the wireless charging manner in which the transmission power is adjustable can be mainly used to control the constant-current charging stage of the battery 232. In other examples, the device to-be-charged 230 can still be provided with the converting circuit. When the battery is in the trickle charging stage or in the constant-voltage charging stage, the conventional wireless charging manner illustrated in FIG. 1 can be adopted for charging. Specifically, when the battery 232 is in the trickle charging stage or in the constant-voltage charging stage, the converting circuit of the device to-be-charged 230 can convert the output voltage and the output current of the wireless receiving circuit 231 to make the output voltage and the output current of the wireless receiving circuit 231 meet requirements on charging in the trickle charging stage or in the constant-voltage charging stage. Compared with the constant-current charging stage, charging power of the battery 232 received in the trickle charging stage or in the constant-voltage charging stage is relatively low, so conversion efficiency loss and heat accumulation of the converting circuit of the device to-be-charged 230 are acceptable, which will be described in detail hereinafter in conjunction with FIG. 7.

Figure 7:
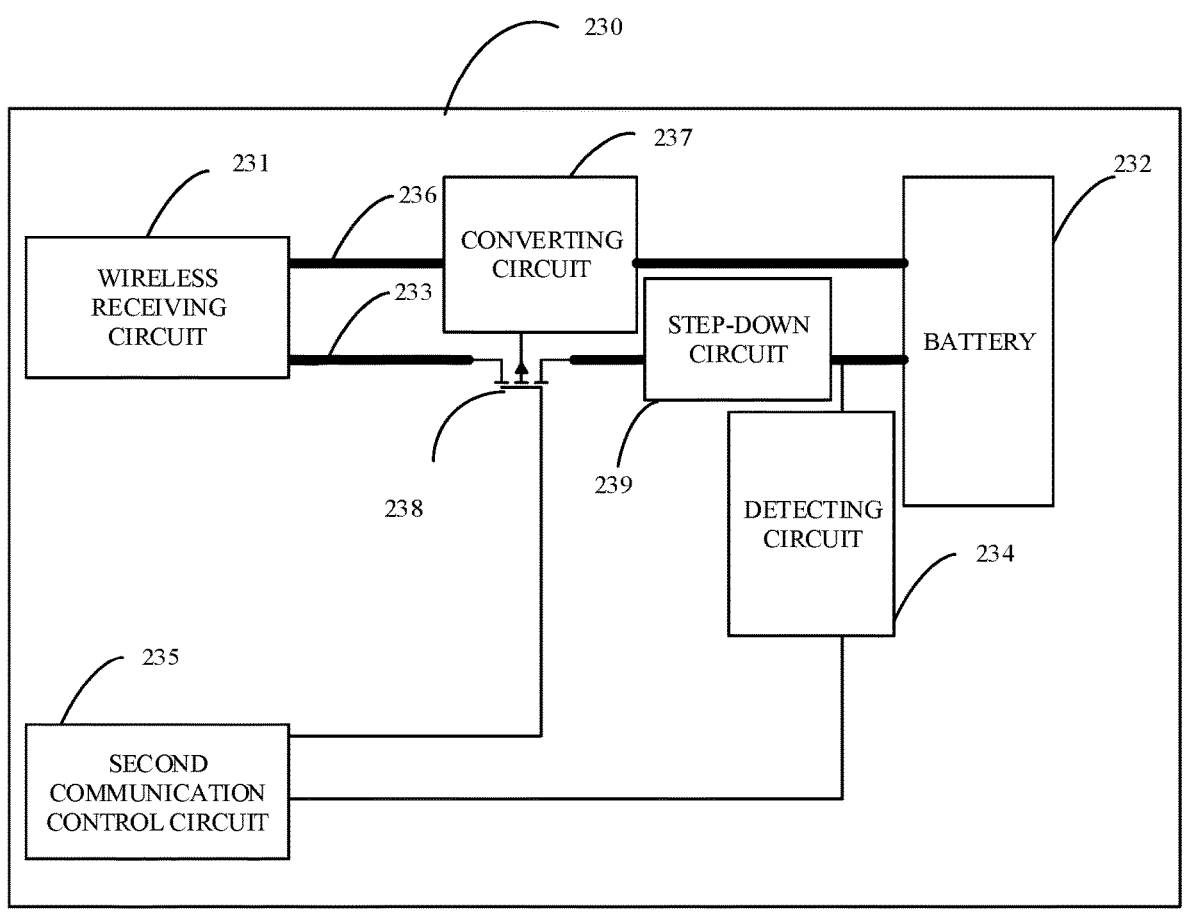
FIG. 7 is a schematic structural diagram of a device to-be-charged according to an implementation of the present disclosure.

As illustrated in FIG. 7, the device to-be-charged 230 further includes a second charging channel 236. The second charging channel 236 is provided with a converting circuit 237. The converting circuit 237 is configured to receive the output voltage and the output current of the wireless receiving circuit 231 and conduct a constant-voltage control and/or a constant-current control on the output voltage and/or the output current of the wireless receiving circuit 231, to make an output voltage and/or an output current of the second charging channel 236 match the charging voltage and/or the charging current currently required by the battery 232, and the battery 232 can be charged according to the output voltage and/or the output current of the second charging channel 236. The second communication control circuit 235 is further configured to control switching between the first charging channel 233 and the second charging channel 236. Exemplarily, as illustrated in FIG. 7, the first charging channel 233 can be provided with a switch 238. The second communication control circuit 235 can be configured to control switching between the first charging channel 233 and the second charging channel 236 by controlling on/off states of the switch 238. As pointed above, in some implementations, the wireless charging device 220 is operable in the first wireless charging mode or in the second wireless charging mode. The charging speed at which the wireless charging device 220 charges the device to-be-charged 230 in the first wireless charging mode is higher than in the second wireless charging mode. When the wireless charging device 220 charges the battery of the device to-be-charged 230 in the first wireless charging mode, the device to-be-charged 230 controls the first charging channel 233 to work. When the wireless charging device 220 charges the battery of the device to-be-charged 230 in the second wireless charging mode, the device to-be-charged 230 controls the second charging channel 236 to work.

As an example, when the battery 232 is in the trickle charging stage and/or in the constant-voltage charging stage, the second communication control circuit 235 can control to charge the battery 232 through the second charging channel 236. A constant-voltage and/or constant-current process of the battery can be controlled by the converting circuit 237 such as a charging IC. When the battery 232 is in the constant-current charging stage, the second communication control circuit 235 can control to charge the battery 232 through the first charging channel 233. Constant-current control of the battery can be realized based on adjustment of transmission power by the wireless charging device. With the converting circuit 237, the device to-be-charged 230 can be better compatible with the conventional wireless charging manner.

It should be noted that, the manner in which the first charging channel 233 or the second charging channel 236 is selected can be various and is not limited to making a selection according to the present charging stage of the battery 232.

In some implementations, the second communication control circuit 235 can be further configured to conduct handshake communication with the first communication control circuit 222 and control the first charging channel 233 to work when the handshake communication succeeds, or control the second charging channel 236 to work when the handshake communication fails.

The handshake communication can refer to recognition of identities of the two communication parties. A successful handshake communication means that both the wireless charging device 220 and the device to-be-charged 230 are operable in the wireless charging manner in which the transmission power is adjustable. A failed handshake communication means that at least one of the wireless charging device 220 and the device to-be-charged 230 does not support the wireless charging manner in which the transmission power is adjustable. When the handshake communication fails, the conventional wireless charging manner (such as a wireless charging manner based on the QI standard) can be adopted for charging through the second charging channel 236.

In some implementations, the second communication control circuit 235 can be further configured to control switching between the first charging channel 233 and the second charging channel 236 according to the temperature of the battery 232.

For example, when the temperature is lower than a preset first threshold, such as 5° C. or 10° C., the second communication control circuit 235 can control to conduct normal wireless charging through the second charging channel 236. When the temperature is higher than or equal to the first threshold, the second communication control circuit 235 can control to conduct quick wireless charging through the first charging channel 233. In addition, when the temperature is higher than a high-temperature threshold such as 50° C., the second communication control circuit 235 can control to stop charging.

As pointed above, the output current of the wireless receiving circuit 231 can be a pulsating DC, which can reduce lithium precipitation of the battery 232 and prolong service life of the battery. When the output current of the wireless receiving circuit 231 is a pulsating DC, the second communication control circuit 235 can detect a peak value or an average value of the pulsating DC with the detecting circuit 234 to conduct subsequent communication or control according to the peak value or the average value of the pulsating DC.

Figure 8:
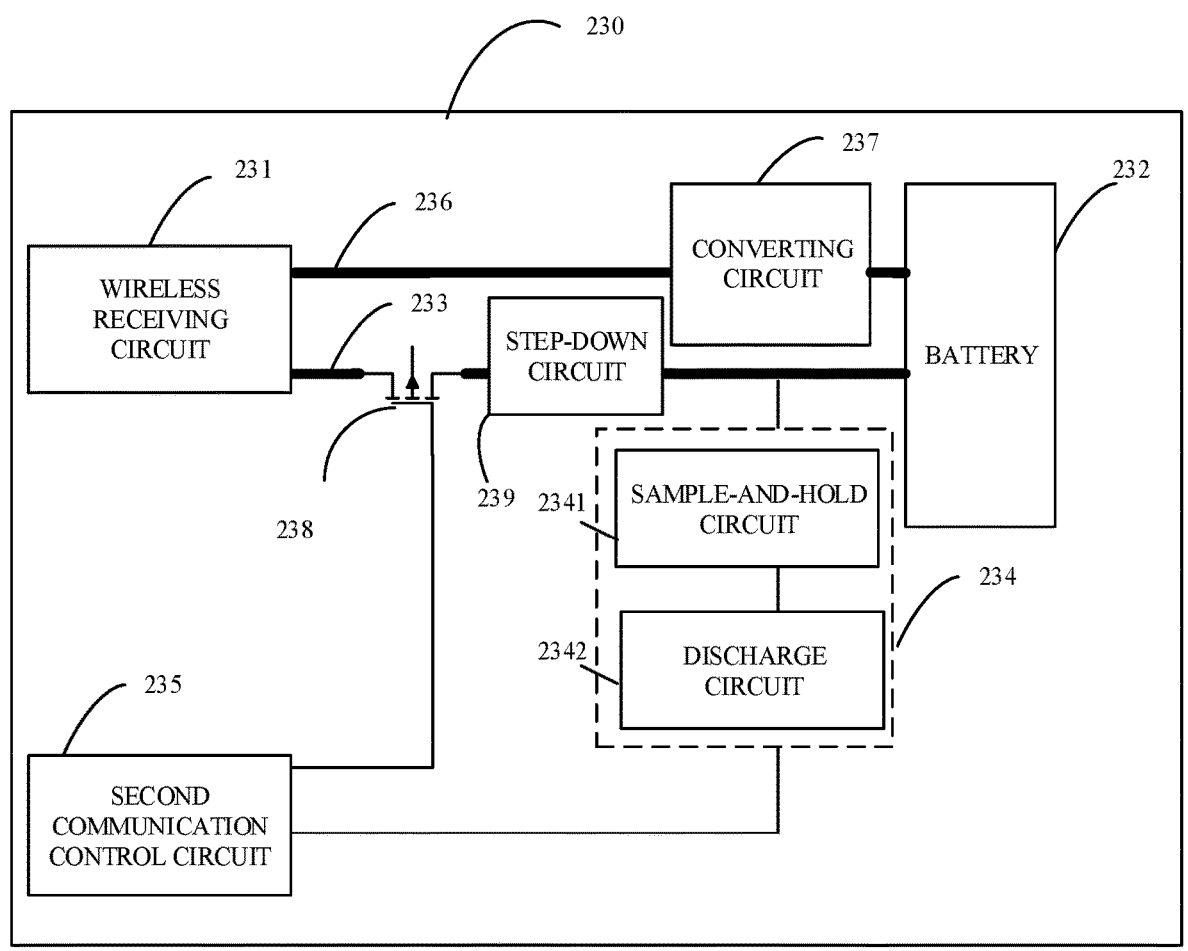
FIG. 8 is a schematic structural diagram of a device to-be-charged according to another implementation of the present disclosure.

In an implementation, the detecting circuit 234 detects the peak value of the pulsating DC. As illustrated in FIG. 8, the detecting circuit 234 includes a sample-and-hold circuit 2341. The sample-and-hold circuit 2341 is configured to sample the pulsating DC when the sample-and-hold circuit 2341 is in a sample state and hold a peak current of the pulsating DC when the sample-and-hold circuit 2341 is in a hold state. The second communication control circuit 235 is further configured to determine whether the sample-and-hold circuit 2341 is in the hold state and to obtain the peak current of the pulsating DC held by the sample-and-hold circuit 2341 if the sample-and-hold circuit 2341 is in the hold state.

In some implementations, the sample-and-hold circuit 2341 includes a capacitor, and the sample-and-hold circuit 2341 is configured to hold the peak current of the pulsating DC based on the capacitor of the sample-and-hold circuit

2341. The detecting circuit 234 further includes a discharge circuit 2342, and the second communication control circuit 235 is further configured to release electric charges across the capacitor of the sample-and-hold circuit 2341 via the discharge circuit 2342 to make the sample-and-hold circuit 2341 switch to the sample state from the hold state.

In some examples, the wireless charging device 220 further includes an external interface and a wireless data transmission circuit. The external interface is configured to be coupled with an electronic device with a data processing and transmission function. The external interface can be the charging interface mentioned above or other interfaces. The first communication control circuit 222 is further configured to charge the device to-be-charged 230 wirelessly according to an output power of the electronic device with a data processing and transmission function when the external interface is coupled with the electronic device. The wireless data transmission circuit is configured to transmit data stored in the electronic device to the device to-be-charged 230 via a wireless link, or transmit data stored in the device to-be-charged 230 to the electronic device via the wireless link, when first communication control circuit 222 charges the device to-be-charged 230 wirelessly according to the output power of the electronic device. The wireless data transmission circuit is configured to transmit at least one of: data in USB protocol format, data in display port (DP) protocol format, and data in mobile high-definition link (MHL) protocol format.

Apparatus implementations of the disclosure have been described in detail above in conjunction with FIG. 2 to FIG. 8. The following will describe in detail method implementations of the disclosure in conjunction with FIG. 9 to FIG. 10. Apparatus implementations and method implementations correspond to each other. Therefore, for details not elaborated in method implementations, reference can be made to the foregoing apparatus implementations.

Figure 9:
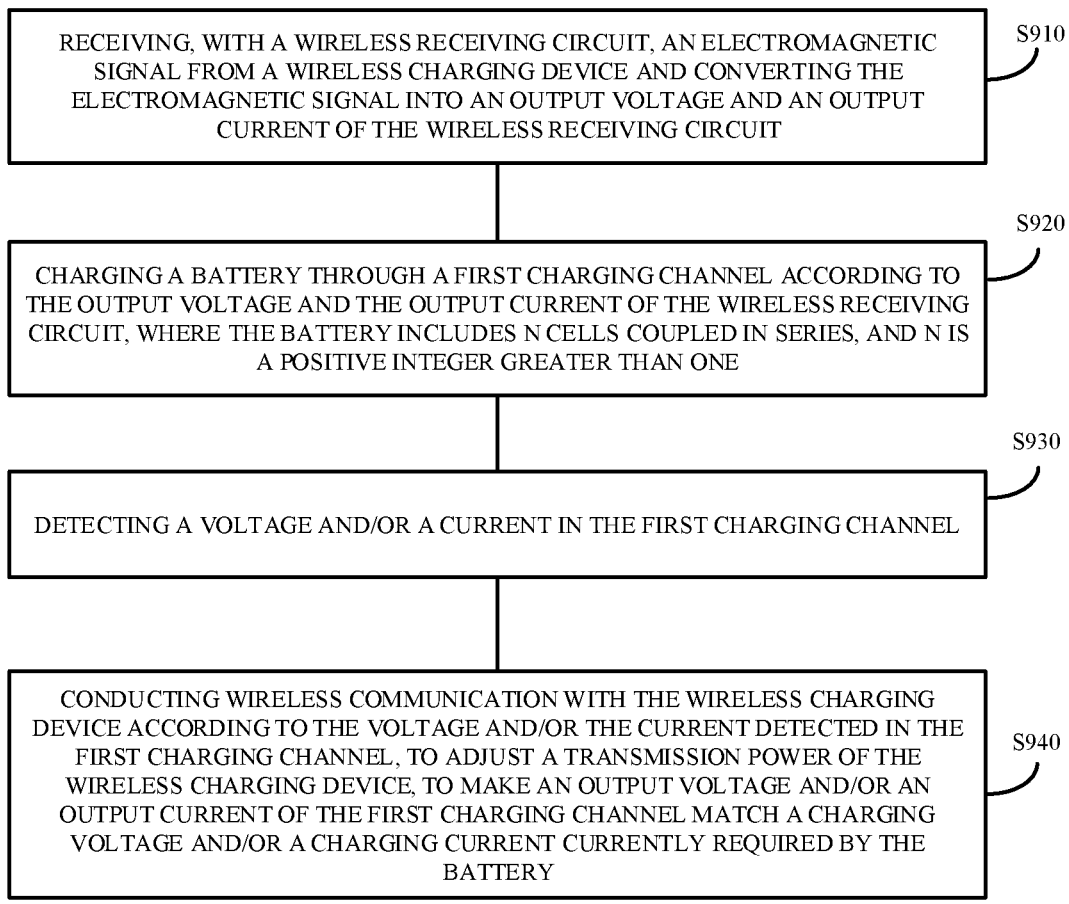
FIG. 9 is a schematic flowchart of a wireless charging method according to an implementation of the present disclosure.

FIG. 9 is a schematic flowchart illustrating a wireless charging method according to an implementation of the present disclosure. The method is applicable to a device-to-be-charged, such as the device-to-be-charged 230 described above. The method illustrated in FIG. 9 includes operations at S910 to S940.

At S910, a wireless receiving circuit receives an electromagnetic signal from a wireless charging device and converts the electromagnetic signal into an output voltage and an output current of the wireless receiving circuit.

At S920, a battery is charged through a first charging channel according to the output voltage and the output current of the wireless receiving circuit, where the battery includes N cells coupled in series, and N is a positive integer greater than one.

At S930, a voltage and/or a current in the first charging channel is detected.

At S940, conduct wireless communication with the wireless charging device according to the voltage and/or the current detected in the first charging channel, whereby the wireless charging device adjusts of the wireless charging device, to make an output voltage and/or an output current of the first charging channel match a charging voltage and/or a charging current currently required by the battery.

In an implementation, operations at S920 include the following. The output voltage of the wireless receiving circuit is decreased to obtain the output voltage and the output current of the first charging channel, and the battery can be charged according to the output voltage and the output current of the first charging channel.

In an implementation, decreasing of the output voltage of the wireless receiving circuit is achieved by a Buck circuit or a charge pump.

In an implementation, operations at S940 include sending adjustment information to the wireless charging device, where the adjustment information is for instructing the wireless charging device to adjust an output voltage and/or an output current of a power supply device.

In an implementation, the power supply device is an adaptor, a power bank, or a computer.

In an implementation, the charging stages of the battery include at least one of a trickle charging stage, a constant-voltage charging stage, and a constant-current charging stage.

In an implementation, operations at S940 include the following. In the constant-voltage charging stage of the battery, conduct wireless communication with the wireless charging device according to the voltage and/or the current detected in the first charging channel, to adjust the transmission power of the wireless charging device, so as to make the output voltage of the first charging channel match a charging voltage corresponding to the constant-voltage charging stage.

In an implementation, operations at S940 include the following. In the constant-current charging stage of the battery, conduct wireless communication with the wireless charging device according to the voltage and/or the current detected in the first charging channel, to adjust the transmission power of the wireless charging device, so as to make the output current of the first charging channel match a charging current corresponding to the constant-current charging stage.

In an implementation, the method illustrated in FIG. 9 further includes sending battery-state information to the wireless charging device, whereby the wireless charging device adjusts the transmission power of the wireless transmitting circuit according to the battery-state information, where the battery-state information includes a present power and/or a present voltage of the battery.

In an implementation, the wireless communication is a two-way wireless communication.

In an implementation, the wireless communication is based on Bluetooth, Wi-Fi, or backscatter modulation.

In an implementation, information communicated in the wireless communication includes at least one of: temperature information of the battery, information indicative of a peak value or an average value of a charging voltage and/or a charging current of the battery, information indicative of over-voltage protection or over-current protection, and power-delivery efficiency information indicative of efficiency in power delivery between the wireless charging device and the wireless receiving circuit.

In an implementation, the method illustrated in FIG. 9 further includes the following. Conduct a constant-voltage control and/or a constant-current control on the output voltage and/or the output current of the wireless receiving circuit to obtain an output voltage and/or an output current of a second charging channel, so as to make the output voltage and/or the output current of the second charging channel match the charging voltage and/or the charging current currently required by the battery, and charge the battery according to the output voltage and/or the output current of the second charging channel. Control switching between the first charging channel and the second charging channel.

In an implementation, the method illustrated in FIG. 9 further includes conducting handshake communication with the wireless charging device and controlling the first charging channel to work when the handshake communication succeeds, or controlling the second charging channel to work when the handshake communication fails.

In an implementation, the method illustrated in FIG. 9 further includes controlling switching between the first charging channel and the second charging channel according to a temperature of the battery.

In an implementation, the current in the first charging channel is a constant DC, a pulsating DC, or an AC.

In an implementation, the wireless charging device is operable in a first wireless charging mode or in a second wireless charging mode, and a charging speed at which the wireless charging device charges the battery in the first wireless charging mode is higher than in the second wireless charging mode. The method illustrated in FIG. 9 further includes communicating with the wireless charging device to negotiate for use of the first wireless charging mode or the second wireless charging mode for wireless charging.

Figure 10:
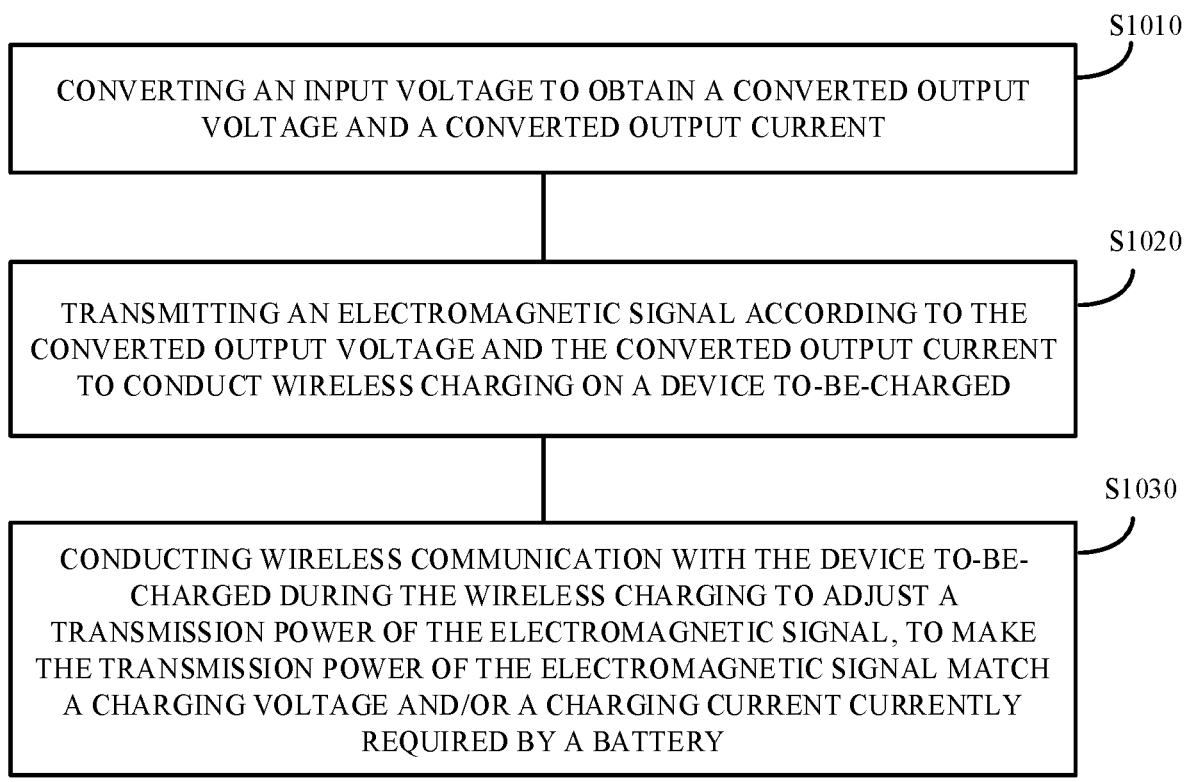
FIG. 10 is a schematic flowchart of a wireless charging method according to another implementation of the present disclosure.

FIG. 10 is a schematic flowchart illustrating a wireless charging method according to another implementation of the present disclosure. The method is applicable to a wireless charging device, such as the wireless charging device 220 described above. The method illustrated in FIG. 10 includes operations at S1010 to S1030.

At S1010, an input voltage is converted to obtain a converted output voltage and a converted output current.

At S1020, an electromagnetic signal is transmitted according to the converted output voltage and the converted output current to charge a device to-be-charged wirelessly.

At S1030, conduct wireless communication with the device to-be-charged during wireless charging to adjust a transmission power of the electromagnetic signal, to make the transmission power of the electromagnetic signal match a charging voltage and/or a charging current currently required by a battery.

In an example, the input voltage is provided by a power supply device. The method illustrated by FIG. 10 further includes communicating with the power supply device to adjust an output voltage and/or an output current of the power supply device, so as to adjust the transmission power of the electromagnetic signal.

In an example, operations at S1030 include receiving adjustment information from the device to-be-charged, where the adjustment information is used for instructing adjustment of the output voltage and/or the output current of the power supply device.

In an example, the method illustrated in FIG. 10 further includes receiving an AC from outside and generating the input voltage according to the AC.

In an example, the AC is 220 V.

In an example, the present charging stage of the battery includes at least one of a trickle charging stage, a constant-voltage charging stage, and a constant-current charging stage.

In an example, operations at S1030 include the following. In the constant-voltage charging stage of the battery, conduct wireless communication with the device to-be-charged, to adjust the transmission power of the electromagnetic signal, so as to make a charging voltage of the battery match a charging voltage corresponding to the constant-voltage charging stage.

In an example, operations at S1030 include the following. In the constant-current charging stage of the battery, conduct wireless communication with the device to-be-charged, to adjust the transmission power of the electromagnetic signal, to make a charging current of the battery match a charging current corresponding to the constant-current charging stage.

In an example, the method illustrated in FIG. 10 further includes receiving battery-state information from the device to-be-charged and adjusting the transmission power of the electromagnetic signal according to the battery-state information, where the battery-state information includes a present power and/or a present voltage of the battery.

In an example, the wireless communication is a two-way wireless communication.

In an example, the wireless communication is based on Bluetooth, Wi-Fi, or backscatter modulation.

In an example, information communicated in the wireless communication includes at least one of: temperature information of the battery, information indicative of a peak value or an average value of a charging voltage and/or a charging current of the battery, information indicative of over-voltage protection or over-current protection, and power-delivery efficiency information indicative of efficiency in power delivery between a wireless transmitting circuit and the device to-be-charged.

In an example, the information communicated in the wireless communication includes the power-delivery efficiency information. The method illustrated in FIG. 10 further includes determining an adjustment range of the transmission power of the electromagnetic signal according to the power-delivery efficiency information.

All or part of the above implementations can be implemented through software, hardware, firmware, or any other combination thereof. When implemented by software, all or part of the above implementations can be implemented in the form of a computer program product. The computer program product includes one or more computer instructions. When the computer program instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fibre, a digital subscriber line (DSL), etc. The wireless manner can be, for example, infrared, wireless, microwave, etc. The computer readable storage medium can be any computer accessible usable-medium or a data storage device such as a server, a data centre, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be appreciated that the systems, apparatuses, and methods disclosed in implementations herein may also be implemented in various other manners. For example, the above apparatus implementations are merely illustrative, e.g., the division of units is only a division of logical functions, and there may exist other ways of division in practice, e.g., multiple units or components may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

The apparatuses and devices disclosed in the disclosure may both be a system-on-chip or a apparatus or device with housing.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Additionally, various functional units described in implementations herein may be integrated into one processing unit or may be present as a number of physically separated units, and two or more units may be integrated into one.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A device to-be-charged, comprising:
a battery, comprising N cells coupled in series, wherein N is a positive integer greater than one;
a wireless receiving circuit, configured to receive an electromagnetic signal from a wireless charging device and convert the electromagnetic signal into an output voltage and an output current of the wireless receiving circuit;
a first charging channel, through which the output voltage and the output current of the wireless receiving circuit are received and provided to the battery for charging;
a detecting circuit, configured to detect at least one of a voltage and a current in the first charging channel;
a communication control circuit, configured to conduct wireless communication with the wireless charging device according to the at least one of the voltage and the current in the first charging channel detected by the detecting circuit, wherein the wireless charging device is configured to adjust a transmission power of the wireless charging device according to the wireless communication, to make at least one of an output voltage and an output current of the first charging channel match at least one of a charging voltage and a charging current currently required by the battery; and
a second charging channel, provided with a converting circuit, wherein the converting circuit is configured to receive the output voltage and the output current of the wireless receiving circuit and conduct at least one of a constant-voltage control and a constant-current control on at least one of the output voltage and the output current of the wireless receiving circuit, to make at least one of an output voltage and an output current of the second charging channel match the at least one of the charging voltage and the charging current currently required by the battery, wherein the battery is charged according to the at least one of the output voltage and the output current of the second charging channel;
wherein the communication control circuit is further configured to control switching between the first charging channel and the second charging channel.

2. The device to-be-charged of claim 1, wherein the first charging channel is provided with a step-down circuit, and the step-down circuit is configured to receive the output voltage of the wireless receiving circuit and decrease the output voltage of the wireless receiving circuit to obtain the output voltage and the output current of the first charging channel, wherein the battery is charged according to the output voltage and the output current of the first charging channel.

3. The device to-be-charged of claim 2, wherein the communication control circuit configured to conduct wireless communication with the wireless charging device according to the at least one of the voltage and the current in the first charging channel detected by the detecting circuit is configured to:
send adjustment information to the wireless charging device, wherein the adjustment information is for instructing the wireless charging device to adjust at least one of an output voltage and an output current of a power supply device.

4. The device to-be-charged of claim 1, wherein the communication control circuit is further configured to send battery-state information to the wireless charging device, whereby the wireless charging device adjusts the transmission power of the wireless charging device according to the battery-state information, wherein the battery-state information comprises at least one of a present power and a present voltage of the battery of the device to-be-charged.

5. The device to-be-charged of claim 1, wherein information communicated between the communication control circuit and the wireless charging device comprises at least one of:
temperature information of the battery;
information indicative of a peak value or an average value of at least one of a charging voltage and a charging current of the battery;
information indicative of over-voltage protection or over-current protection; and
power-delivery efficiency information indicative of efficiency in power delivery between the wireless charging device and the wireless receiving circuit.

6. The device to-be-charged of claim 1, wherein the communication control circuit is further configured to conduct handshake communication with the wireless charging device and control the first charging channel to work when the handshake communication succeeds, or control the second charging channel to work when the handshake communication fails.

7. The device to-be-charged of claim 1, wherein the communication control circuit is further configured to control switching between the first charging channel and the second charging channel according to a temperature of the battery.

8. The device to-be-charged of claim 1, wherein the current in the first charging channel is a pulsating DC, and the detecting circuit comprises:
- a sample-and-hold circuit, configured to sample the pulsating DC when the sample-and-hold circuit is in a sample state and hold a peak current of the pulsating DC when the sample-and-hold circuit is in a hold state; and wherein
- the communication control circuit is further configured to determine whether the sample-and-hold circuit is in the hold state and to obtain the peak current of the pulsating DC held by the sample-and-hold circuit based on a determination that the sample-and-hold circuit is in the hold state.

9. The device to-be-charged of claim 8, wherein
- the sample-and-hold circuit comprises a capacitor, and the sample-and-hold circuit is configured to hold the peak current of the pulsating DC based on the capacitor of the sample-and-hold circuit; and
- the detecting circuit further comprises a discharge circuit, and the communication control circuit is further configured to release electric charges across the capacitor of the sample-and-hold circuit via the discharge circuit to make the sample-and-hold circuit switch to the sample state from the hold state.

10. A method for wirelessly charging a device to-be-charged, comprising:
- receiving, with a wireless receiving circuit, an electromagnetic signal from a wireless charging device, and converting the electromagnetic signal into an output voltage and an output current of the wireless receiving circuit;
- charging a battery through a first charging channel according to the output voltage and the output current of the wireless receiving circuit, wherein the battery comprises N cells coupled in series, and N is a positive integer greater than one;
- detecting at least one of a voltage and a current in the first charging channel; and
- conducting wireless communication with the wireless charging device according to the at least one of the voltage and the current detected in the first charging channel, wherein the wireless charging device adjusts a transmission power of the wireless charging device according to the wireless communication, to make at least one of an output voltage and an output current of the first charging channel match at least one of a charging voltage and a charging current currently required by the battery;
- conducting at least one of a constant-voltage control and a constant-current control on at least one of the output voltage and the output current of the wireless receiving circuit to obtain at least one of an output voltage and an output current of a second charging channel, to make the at least one of the output voltage and the output current of the second charging channel match the at least one of the charging voltage and the charging current currently required by the battery, and charging the battery according to the at least one of the output voltage and the output current of the second charging channel; and
- controlling switching between the first charging channel and the second charging channel.

* * * * *